(12) United States Patent
Park et al.

(10) Patent No.: US 7,854,493 B2
(45) Date of Patent: Dec. 21, 2010

(54) METHOD OF MANUFACTURING INKJET PRINTHEAD AND INKJET PRINTHEAD MANUFACTURED USING THE METHOD

(75) Inventors: Byung-ha Park, Suwon-si (KR);
Young-ung Ha, Suwon-si (KR);
Sung-joon Park, Suwon-si (KR);
Jae-sik Min, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1140 days.

(21) Appl. No.: 11/470,640

(22) Filed: Sep. 7, 2006

(65) Prior Publication Data

US 2007/0059531 A1 Mar. 15, 2007

(30) Foreign Application Priority Data

Sep. 13, 2005 (KR) .............. 10-2005-0085202

(51) Int. Cl.
*B41J 2/135* (2006.01)
(52) U.S. Cl. ................................................ 347/45
(58) Field of Classification Search .......... 347/40–47
See application file for complete search history.

(56) References Cited

U.S. PATENT DOCUMENTS

| | | | |
|---|---|---|---|
| 5,907,333 A | 5/1999 | Patil et al. | |
| 6,340,224 B1 * | 1/2002 | Hotomi et al. | 347/70 |
| 6,354,698 B1 | 3/2002 | Tachihara et al. | |
| 6,612,688 B2 | 9/2003 | Tachihara et al. | |
| 2002/0047877 A1 | 4/2002 | Tachihara et al. | |
| 2004/0231780 A1 * | 11/2004 | Clark et al. | 156/230 |
| 2005/0035999 A1 * | 2/2005 | Kitahara et al. | 347/47 |
| 2005/0167043 A1 * | 8/2005 | Stoffel et al. | 156/292 |
| 2006/0262157 A1 * | 11/2006 | Park et al. | 347/20 |
| 2007/0060675 A1 * | 3/2007 | Park et al. | 523/457 |

FOREIGN PATENT DOCUMENTS

| | | |
|---|---|---|
| CN | 1197817 | 11/1998 |
| CN | 1223200 | 7/1999 |
| CN | 1089063 | 8/2002 |
| JP | 2004-42399 | 2/2004 |
| KR | 2003-28133 | 4/2003 |
| KR | 2004-49064 | 6/2004 |
| KR | 2004-54036 | 6/2004 |

OTHER PUBLICATIONS

Chinese Office Action issued Feb. 27, 2009 in Chinese Application No. 2006101718753.
Chinese Office Action dated Sep. 25, 2009 issued in CN 2006101718753.

* cited by examiner

*Primary Examiner*—Charlie Peng
(74) *Attorney, Agent, or Firm*—Stanzione & Kim, LLP

(57) ABSTRACT

A method of manufacturing an inkjet printhead, including forming a nozzle layer by radiating actinic radiation to a cross-linked polymer resist composition including a precursor polymer, a cationic photoinitiator, and a solvent, in which a concentration of the cationic photoinitiator is varied to control a tapered angle of a nozzle included in the nozzle layer.

18 Claims, 12 Drawing Sheets

METHOD OF MANUFACTURING INKJET PRINTHEAD AND INKJET PRINTHEAD MANUFACTURED USING THE METHOD

CROSS-REFERENCE TO RELATED APPLICATIONS

This application claims priority under 35 U.S.C. §119(a) from Korean Patent Application No. 10-2005-0085202, filed on Sep. 13, 2005 in the Korean Intellectual Property Office, the disclosure of which is incorporated herein in its entirety by reference.

BACKGROUND OF THE INVENTION

1. Field of the Invention

The present general inventive concept relates to a method of manufacturing an inkjet printhead and an inkjet printhead manufactured using the method, and more particularly, to a method of manufacturing an inkjet printhead in which a shape of an ink ejection nozzle can be controlled.

2. Description of the Related Art

An inkjet printhead is an apparatus that ejects ink droplets on desired positions of a recording paper in order to print predetermined color images. Inkjet printheads are categorized into two types according to the ink droplet ejection mechanism used: a thermal inkjet printhead and a piezoelectric inkjet printhead. The thermal inkjet printhead ejects ink droplets due to an expansion force of ink bubbles generated by thermal energy. The piezoelectric inkjet printhead ejects ink droplets by pressure applied to ink due to a deformation of a piezoelectric body. The two types of inkjet printheads use a different operating element, but each push ink droplets with a predetermined energy.

FIG. 1 illustrates a conventional thermal inkjet printhead. Referring to FIG. 1, the conventional inkjet printhead includes a substrate 10, a flow path forming layer 20 stacked on the substrate 10, and a nozzle layer 30 formed on the flow path forming layer 20. An ink feed hole 51 is formed in the substrate 10. An ink chamber 53 in which ink is filled and a restrictor 52 that connects the ink feed hole 51 and the ink chamber 53 are formed in the flow path forming layer 20. A nozzle 54 through which the ink is ejected from the ink chamber 53 is formed in the nozzle layer 30. In addition, a heater 41, made of a heating resistor to heat the ink in the ink chamber 53, and an electrode 42, to apply a current to the heater 41, are formed on the substrate 20.

The ink droplet ejection mechanism of the thermal inkjet printhead is as follows. Ink is supplied from an ink storage container (not illustrated) to the ink chamber 53 through the ink feed hole 51 and the restrictor 52. The ink that is filled in the ink chamber 53 is heated by the heater 41. Accordingly, ink bubbles are generated by ink evaporation, and the generated bubbles are expanded to exert pressure on the ink filled in the ink chamber 53. Thereafter, ink droplets are ejected through the nozzle 54 out of the ink chamber 53.

When an ink droplet is ejected outside of the nozzle 54, a meniscus of the ink in the ink chamber 53 retreats to the restrictor 52, and ink is refilled up to the nozzle 54 by capillary action. In this case, particularly when the nozzle 54 is perpendicular to the substrate 10, a convex meniscus protrudes to an outside of the nozzle 54 by a pressure applied thereto, and thus there is a time delay before the meniscus returns to a concave form. Accordingly, high speed ink droplet ejection is difficult to achieve and sizes of the ink droplets are not uniform.

Accordingly, attempts have been made to solve the above problems by modifying a shape of a nozzle in various ways. It is known that when a nozzle is tapered, the tapering affects a behavior of an ink meniscus or a shape of ink ejection in various ways. For example, a capillary force of an ink meniscus becomes larger when a curvature of the meniscus is large as compared to when the curvature of the meniscus is small, and thus if the curvature of the meniscus of the ink that moves to the nozzle is reduced, the flux of the ink can be suppressed. Thus a nozzle may be tapered, having a diameter that decreases in an ejecting direction of ink therefrom. However, even when a nozzle is tapered, a flux of ink can vary depending on a viscosity of the ink. Thus it is difficult to obtain an appropriate tapered angle.

A nozzle can be tapered by processing a polyimide-based resin using an Excimer laser. However, it is difficult to obtain a sharply tapered nozzle using an Excimer laser and a cost thereof is high.

Alternatively, a nozzle can be tapered in a mold by fabricating a mold having a shape of a taper by heating a thermoplastic resin and filling the mold with a resist composition. However, a taper mold fabricated by heat does not demonstrating good reproducibility.

Also, a nozzle can be tapered stepwise by selectively radiating light, such as UV radiation, twice or more. However, this method is complicated and thus is not practical.

SUMMARY OF THE INVENTION

The present general inventive concept provides a method of manufacturing an inkjet printhead in which a tapered angle of a nozzle can be precisely controlled by controlling a concentration of a cationic photoinitiator included in a cross-linkable polymer resist composition, and an inkjet printhead manufactured using the method.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of manufacturing an inkjet printhead, the method including forming a nozzle layer by radiating actinic radiation to a cross-linkable polymer resist composition including an epoxy precursor polymer, a cationic photoinitiator, and a solvent, and a tapered angle of a nozzle included in the nozzle layer is controlled by varying a concentration of the cationic photoinitiator in the cross-linkable polymer resist composition.

The tapered angle of the nozzle may increase as the concentration of the cationic photoinitiator increases, An amount of the cationic photoinitiator may be about 4 to about 12% by weight based on a total weight of the cross-linked polymer resist composition. The amount of the photoinitiator may be about 6 to about 8% by weight based on the total weight of the cross-linked polymer resist composition.

The tapered angle of the nozzle may be about 5° to about 12°.

An exposure energy level of the actinic radiation radiated to the cross-linked polymer resist composition may be about 50 to about 500 mJ/cm$^2$.

The epoxy precursor polymer may be formed of a skeleton monomer including at least one member selected from phenol, o-cresol, p-cresol, bisphenol-A, cycloaliphatic, and mixtures thereof.

An amount of the epoxy precursor polymer may be about 5 to about 50% by weight based on the total weight of the cross-linked polymer resist composition. The amount of the epoxy precursor polymer may be about 10 to about 20% by weight based on the total weight of the cross-linked polymer resist composition. The amount of the epoxy precursor polymer may be about 0.5 to about 20% by weight based on the total weight of the cross-linked polymer resist composition. The amount of the epoxy precursor polymer may be about 1 to about 5% by weight based on the total weight of the cross-linked polymer resist composition.

The epoxy precursor polymer may include at least one member selected from

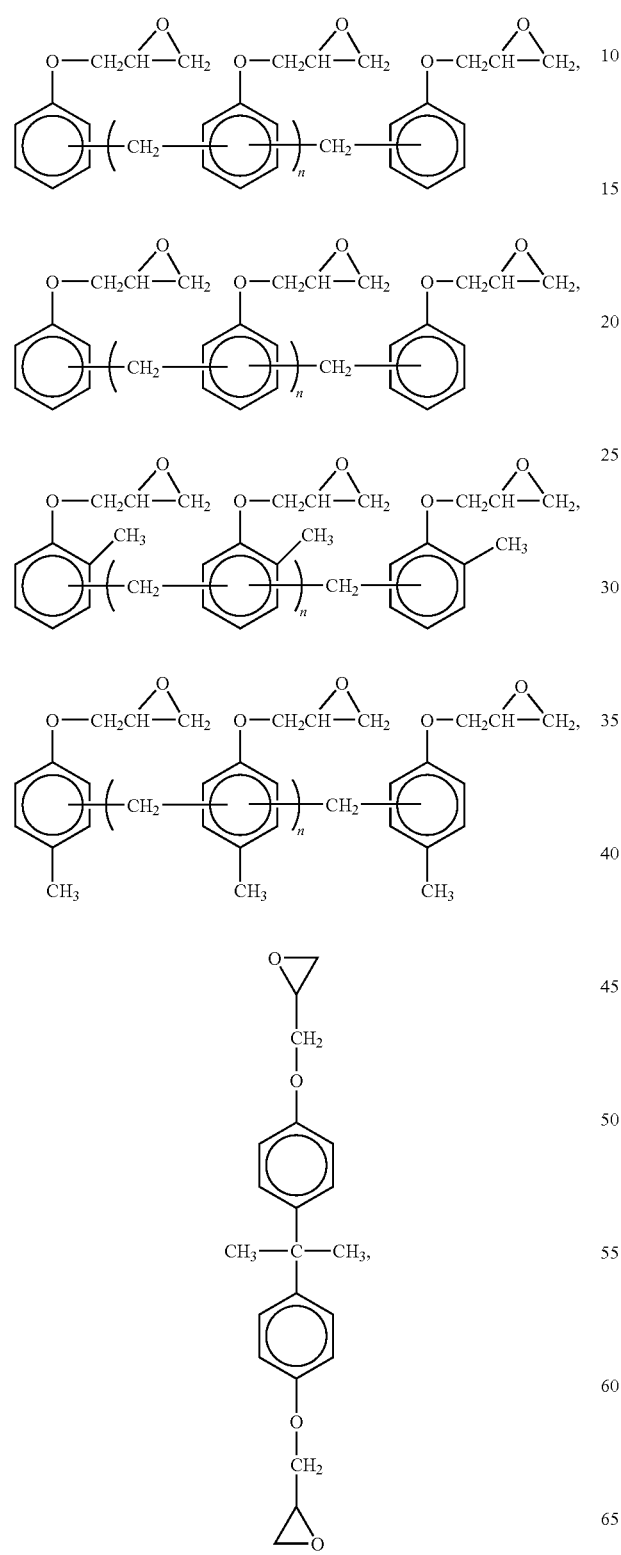

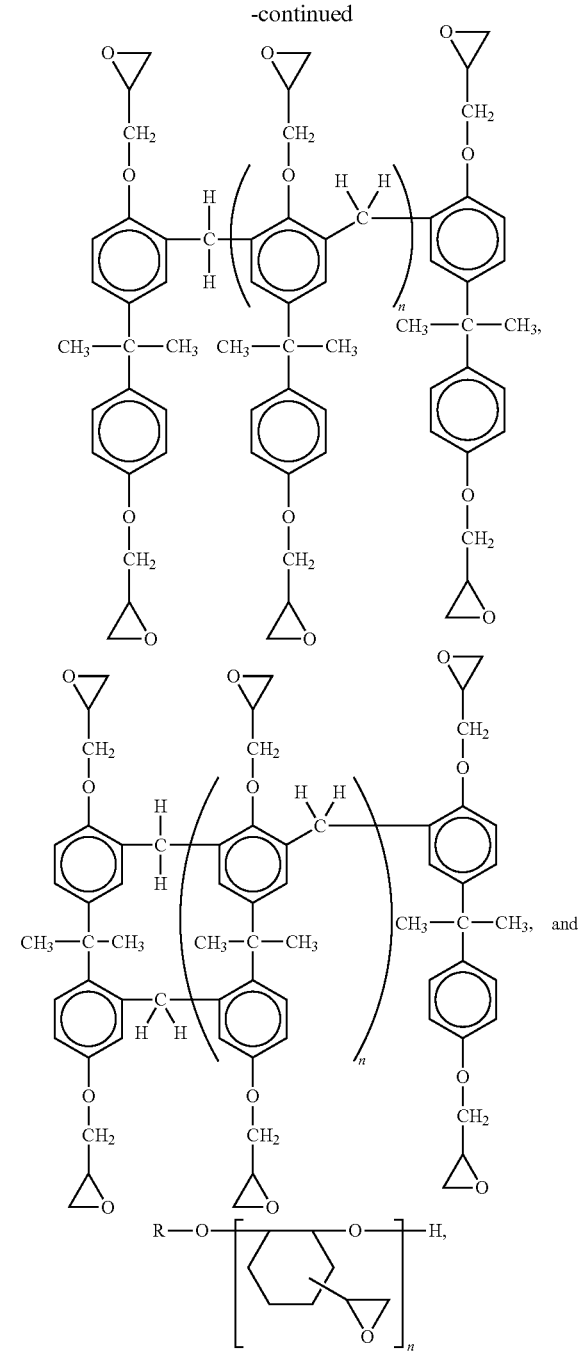

and n may be an integer from 1 to 20.

The cationic photoinitiator may be sulfonium salt or iodinium salt.

An amount of the solvent is about 20 to about 90% weight based on the total weight of the cross-linked polymer resist composition. The amount of the solvent is about 45 to about 75% by weight based on the total weight of the cross-linked polymer resist composition.

The solvent may be at least one member selected from α-butyrolactone, propylene glycol methyl ethyl acetate (PG-MEA), tetrahydrofurane (THF), methyl ethyl ketone, methyl isobutyl ketone, cyclopentanone, and mixtures thereof.

The foregoing and/or other aspects and utilities of the present general inventive concept may also be achieved by providing an inkjet printhead manufactured, including a nozzle layer in which a tapered ink ejection nozzle is formed, the nozzle layer is a hardening result of a cross-linked polymer resist composition formed by actinic radiation, and a tapered angle of the tapered nozzle is about 5° to about 12° with respect to a surface that is perpendicular to the nozzle layer, and a cross-section of the tapered nozzle decreases in an ejection direction of an ink through the tapered nozzle.

The foregoing and/or other aspects and utilities of the present general inventive concept may also be achieved by providing an inkjet printhead, including a nozzle layer in which a tapered ink ejection nozzle is formed, the nozzle layer is a hardening result of a cross-linked polymer resist composition formed by actinic radiation, and the cross-linked polymer resist composition includes at least one epoxy precursor polymer selected from

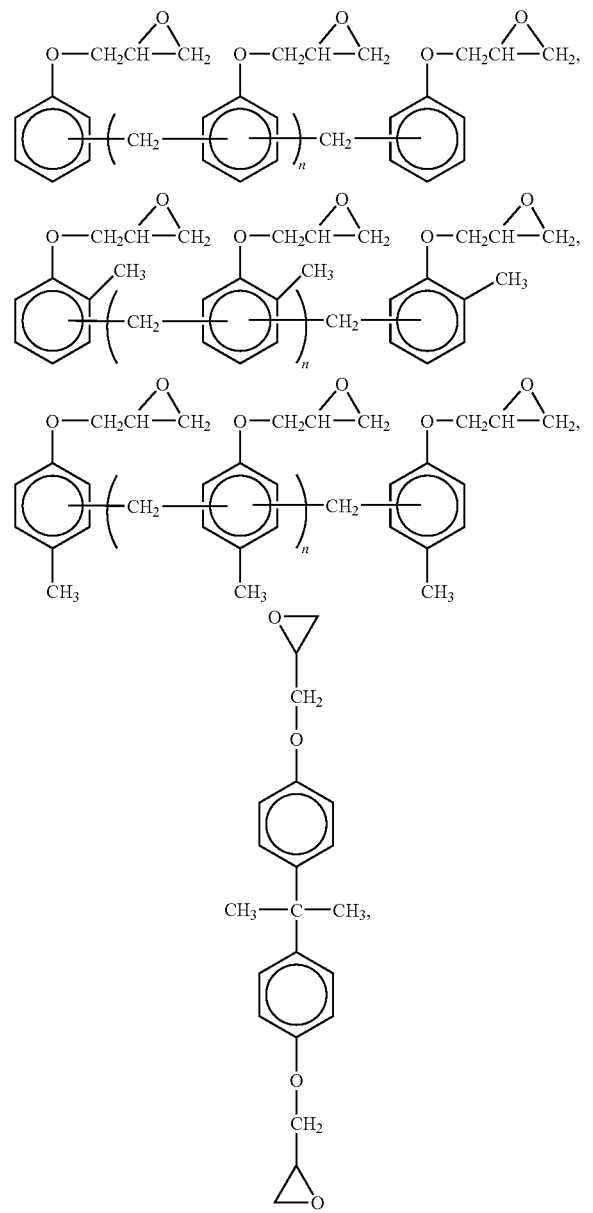

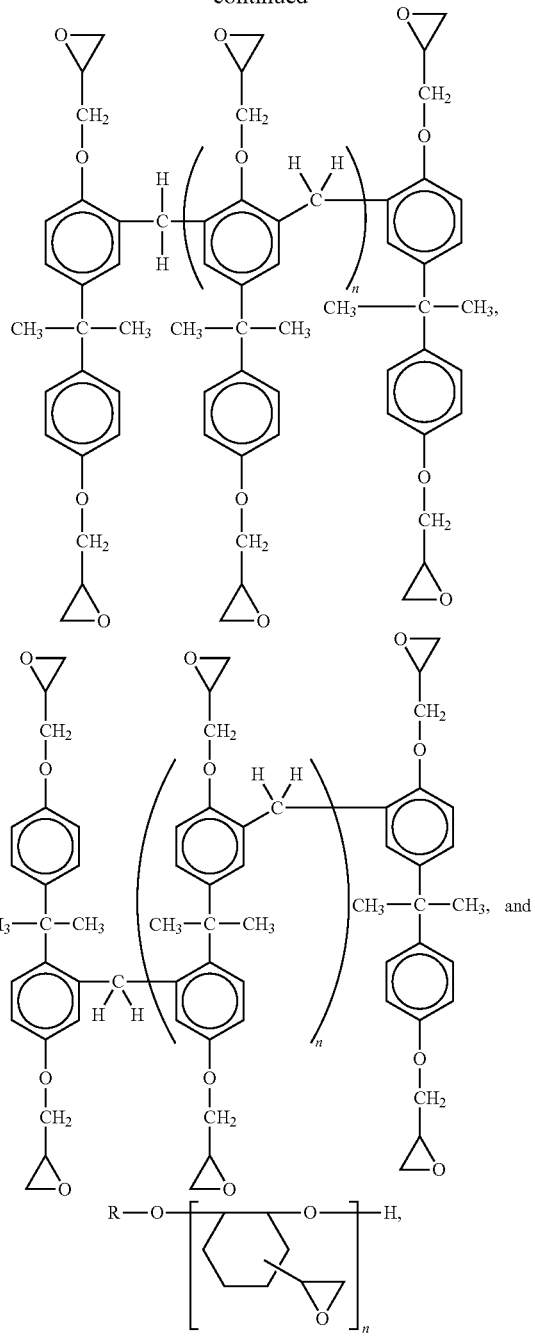

and n is an integer from 1 to 20; about 4 to about 12% by weight of a cationic photoinitiator based on a total weight of the cross-linked polymer resist composition; and a solvent.

The foregoing and/or other aspects and utilities of the present general inventive concept may also be achieved by providing a method of manufacturing a printhead, including coating a cross-linkable polymer resist composition on a surface of a substrate, the cross-linkable polymer resist composition comprising an epoxy precursor polymer, a cationic photoinitiator, and a solvent, cross-linking exposed portions of the cross-linkable polymer resist composition exposed through a mask having a nozzle layer pattern, and removing unexposed portions of the cross-linkable polymer resist composition unexposed through the mask to form a nozzle layer having a tapered nozzle.

The cationic photoinitiator may be selected from the group consisting of an aromatic halonium salt of a Group VA element and an onium salts of a Group VIA element of the Periodic Table. A degree of tapering of the tapered nozzle may correspond to a concentration of the cationic photoinitiator in the cross-linkable polymer resist composition. The method may further include controlling a degree of tapering of the tapered angle by controlling a concentration of the cationic photoinitiator in the cross-linkable polymer resist composition.

The surface of the substrate may include a flow path forming layer to form an ink chamber, a heater to heat ink in the ink chamber, a sacrificial layer covering the heater, and an electrode to apply a current to the heater, and the coating of the cross-linkable polymer resist composition may include coating the cross-linkable polymer resist composition on the surface of the substrate, the flow path forming layer, the sacrificial layer, and the electrode.

The method may further include coating a first positive photoresist on the surface of the substrate having the flow path forming layer, the heater, and the electrode to cover the surface of the substrate, the flow path forming layer, the heater, and the electrode, exposing portions of the first positive photoresist to actinic radiation through a photomask and removing the exposed portions of the first positive photoresist, coating a second positive photoresist on the surface of the substrate having the flow path forming layer, the heater covered by the first positive photoresist, and the electrode to cover the surface of the substrate, the flow path forming layer, the first positive photoresist, and the electrode, and exposing portions of the second positive photoresist to actinic radiation through the photomask and removing the exposed portions of the second positive photoresist, and the sacrificial layer may include unexposed portions of the first and second positive photoresists unexposed through the photomask.

The method may further include blank exposing the sacrificial layer to actinic radiation to lower a height of the sacrificial layer to correspond to a height of the flow path forming layer before coating the cross-linkable polymer resist composition on the surface of the substrate, the flow path forming layer, the sacrificial layer having the height that equal to the height of the flow path forming layer, and the electrode.

The first and second positive photoresists may be imide-based positive photoresists, a height of the sacrificial layer may be higher than a height of the flow path forming layer, and the coating of the cross-linkable polymer resist composition may include coating the cross-linkable polymer resist composition on the surface of the substrate, the flow path forming layer, the sacrificial layer having the height that is higher than the height of the flow path forming layer, and the electrode.

The foregoing and/or other aspects and utilities of the present general inventive concept may also be achieved by providing a method of manufacturing a printhead, including forming a heater to heat ink and an electrode to apply a current to the heater on a substrate, patterning a first cross-linkable polymer resist composition on the substrate where the heater and the electrode are formed to form a flow path forming layer, performing patterning by photolithography twice or more on the substrate where the flow path forming layer is formed to form a sacrificial layer having a top surface that is flat in a space surrounded by the flow path forming layer, patterning a second cross-linkable polymer resist composition on the flow path forming layer and the sacrificial layer to form a nozzle layer, the second cross-linkable polymer resist composition comprising a precursor polymer, a cationic photoinitiator, and a solvent, etching the substrate from a rear surface thereof to form an ink feed hole, and removing the sacrificial layer.

The foregoing and/or other aspects and utilities of the present general inventive concept may also be achieved by providing a cross-linkable polymer negative resist composition, including an epoxy precursor polymer, a cationic photoinitiator, and a solvent. The cationic photoinhibitor may be selected from the group consisting of an aromatic halonium salt of a Group VA element and an onium salt of a Group VIA elements of the Periodic Table.

The foregoing and/or other aspects and utilities of the present general inventive concept may also be achieved by providing an intermediate compound used to manufacture a printhead, the intermediate compound including a substrate comprising a flow path forming layer to form an ink chamber, a heater to heat ink in the ink chamber, a sacrificial layer covering the heater, and an electrode to apply a current to the heater formed on a surface thereof, and a cross-linkable polymer resist composition coated on the surface of the substrate, the flow path forming layer, the sacrificial layer, and the electrode, the cross-linkable polymer resist composition comprising an epoxy precursor polymer, a cationic photoinitiator, and a solvent.

The foregoing and/or other aspects and utilities of the present general inventive concept may also be achieved by providing a printhead, including a substrate, a chamber layer having an ink chamber, a heater to heat the ink in the ink chamber, and an electrode to apply a current to the heater, and a nozzle layer having a tapered nozzle to eject the ink from the ink chamber, the nozzle layer including a cross-linked polymer resist composition comprising an epoxy resin and a cationic photoinitiator.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
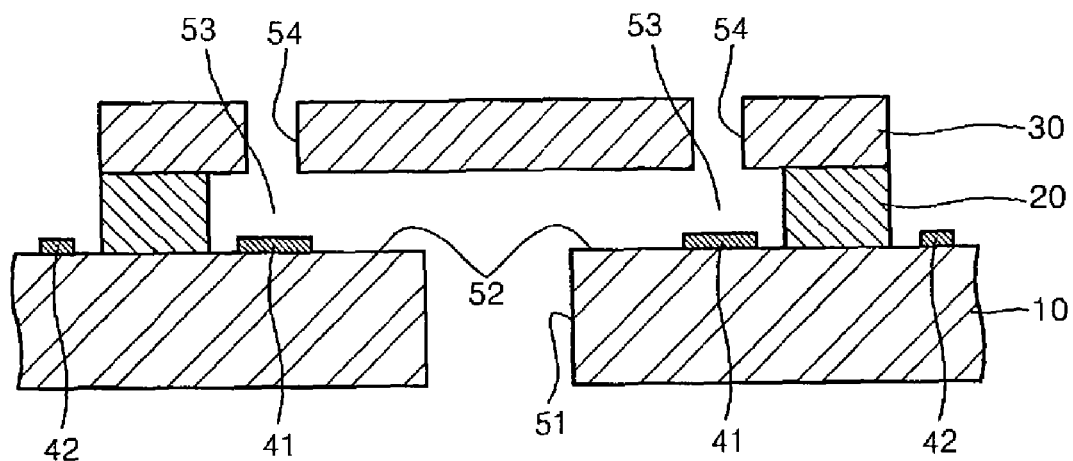
FIG. 1 is a cross-sectional view illustrating a conventional thermal inkjet printhead.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures. In the drawings, thicknesses of layers and regions may be exaggerated for clarity. It will also be understood that when a layer is referred to as being "on" another layer or substrate, it can be directly on the other layer or substrate, or an intervening layer may be present therebetween.

The present general inventive concept will be described mainly with reference to a thermal inkjet printhead; however, the present general inventive concept can be also applied to a piezoelectric inkjet printhead. Also, the present general inventive concept can be applied both to a monolithic and a junction type inkjet printhead. In addition, in the drawings, only a small portion of a silicon wafer is illustrated, and an inkjet printhead according to embodiments of the present general inventive concept can be formed of from one to several tens to several hundreds of chips.

The term "epoxy precursor polymer" refers to an epoxy polymer before being cross-linked, such as by actinic radiation. The term "epoxy resin" refers to an epoxy polymer after being cross-linked, such as by actinic radiation.

FIGS. 2A through 2D are cross-sectional views illustrating a method of forming a tapered angle of a nozzle of an inkjet printhead, according to an embodiment of the present general inventive concept.

Figure 2A:
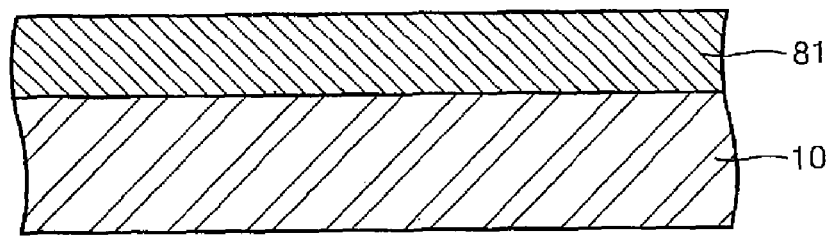
FIGS. 2A through 2D are cross-sectional views illustrating a method of forming a taper angle of a nozzle of an inkjet printhead, according to an embodiment of the present general inventive concept.

First, as illustrated in FIG. 2A, a negative photoresist layer 81 having a cross-linkable polymer resist composition including a precursor polymer, a cationic photoinitiator, and a solvent is formed on a substrate 10. In detail, the photoresist layer 81 is formed by coating a negative photoresist, which is the cross-linkable polymer resist composition, to a predetermined thickness on the entire surface of the substrate 10. Here, the negative photoresist can be coated on an substrate 10 using, for example, a spin coating method. Meanwhile, though not illustrated in FIG. 2A, a chamber layer may be formed between the negative photoresist layer 81 and the substrate 10. The chamber layer can be formed using conventional methods and materials. Alternatively, the negative photoresist layer 81 can be manufactured separately to form a nozzle layer.

Figure 2B:
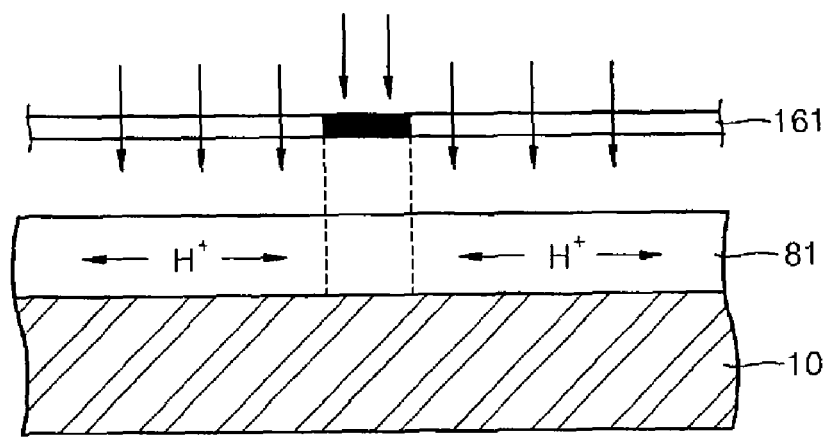

Next, as illustrated in FIG. 2B, the negative photoresist layer 81 is exposed to UV radiation using a photomask 161 in which a nozzle pattern is formed. During the exposure, a portion of the negative photoresist layer 81 that is exposed to the UV radiation is hardened and thus resists chemical attack and has a high mechanical intensity. Portions of the negative photoresist layer 81 that are not exposed, on the other hand, have properties that cause these portions to be dissolved by a developer. In particular, the UV radiation penetrating the negative photoresist layer 81 reacts with the cationic photoinitiator included in the cross-linkable polymer resist composition and generates hydrogen ions, and a cross-linking reaction of the precursor polymer is processed by the hydrogen ions.

Figure 2C:
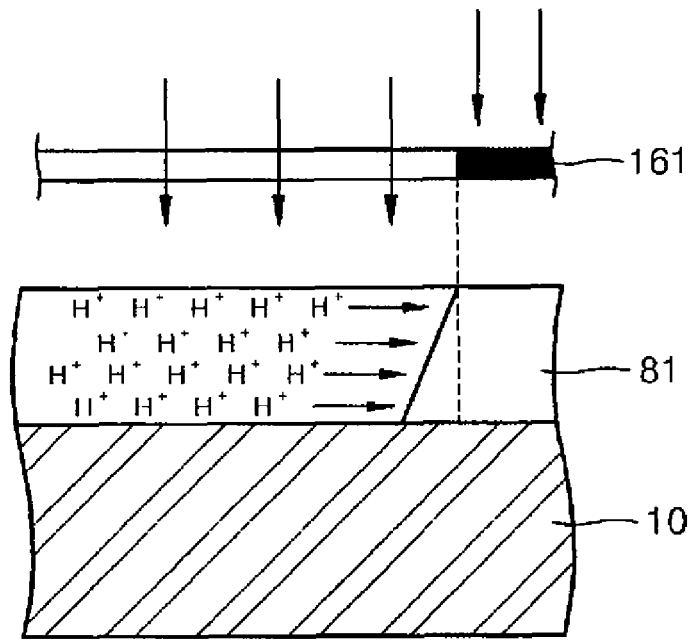

However, as illustrated in FIG. 2C, the UV radiation reacts with the cationic photoinitiator included in the cross-linkable polymer resist composition of the photoresist layer 81 and is dispersed, and thus an intensity of the UV radiation decreases as it approaches a bottom of the negative photoresist layer 81. Accordingly, a quantity of the generated hydrogen ions (i.e., the hydrogen ions generated by the reaction of the UV radiation with the cationic photoinitiator) decreases towards the bottom of the negative photoresist layer 81, and thus a concentration of the hydrogen ions decreases along a specific inclination (i.e., along a boundary line extending from a top of the negative photoresist layer 81 to the bottom thereof and having a predetermined steepness and a predetermined slope). Moreover, as the concentration of the cationic photoinitiator in the cross-linkable polymer resist composition increases, the intensity of the UV radiation decreases towards the bottom of the negative photoresist layer 81 and the quantity of the generated hydrogen ions decreases towards the bottom of the negative photoresist layer 81 (as less of the UV radiation is available to penetrate and react with the cationic photoinitiator towards the bottom of the negative photoresist layer 81). Thus, as the concentration of the cationic photoinitiator increases, the inclination of the concentration of the hydrogen ions increases (i.e., the boundary line becomes less steep and the slope of the boundary line decreases). Thus, approaching the bottom of the negative photoresist layer 81, hardening does not occur at a predetermined inclination.

Figure 2D:
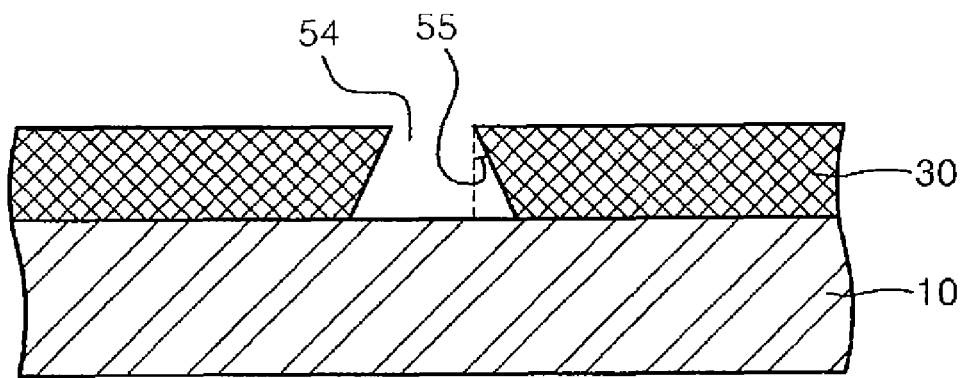

As a result, when the negative photoresist layer 81 is developed and the unexposed portions are removed, as illustrated in FIG. 2D, a nozzle layer 30 is formed in which a nozzle 54 is formed, and the nozzle 54 is tapered at a predetermined tapered angle 55.

The tapered angle 55 varies with the concentration of the cationic photoinitiator included in the cross-linkable polymer resist composition. As the concentration of the cationic photoinitiator increases, the tapered angle 55 of the nozzle increases.

The tapered angle 55 of the nozzle 54 obtained based on the concentration the photoinitiator may be about 5° to about 12°. When the tapered angle 55 is less than about 50, a meniscus of the ink is unstable, and when the tapered angle is 55 greater than about 12°, the meniscus of the ink is also unstable.

An exposure energy level of the actinic radiation used to irradiate the cross-linkable polymer resist composition in the present embodiment may be about 50 to about 500 mJ/cm².

The cross-linkable polymer resist composition, which is the negative photoresist used to form the nozzle layer 30 according to the present embodiment, may be manufactured using, for example, a phenol novolak precursor polymer or an alicyclic precursor polymer including a glycidyl ether functional group as the precursor polymer. The glycidyl ether functional group may be arranged at a site of a hydrogen atom of a phenol hydroxyl group.

An epoxy precursor polymer having a bifunctional ether functional group will now be described, and is represented by the formula below, in which n is an integer:

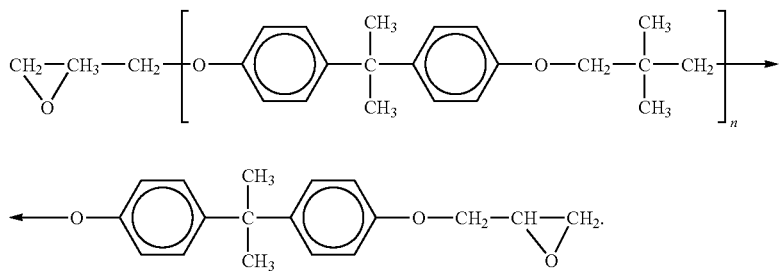

The epoxy precursor polymer having the bifunctional ether functional group can form a film at a low cross-linking concentration.

The epoxy precursor polymer may be about 5 to about 50% by weight based on a total weight of the cross-linkable polymer resist composition. For example, the epoxy precursor polymer may be about 10 to about 20% by weight based on the total weight of the cross-linkable polymer resist composition.

Examples of the bifunctional epoxy precursor polymer include, but are not limited to, EPON 1004, EPON 1001F, and EPON 1010 (available from Shell Chemical), DER-332, DER-331, and DER-164 (available from Dow Chemical), and ERL-4201 and ERL-4289 (available from Union Carbide).

The epoxy precursor polymer having a polyfunctional ether functional group will now be described.

The epoxy precursor polymer having the polyfunctional ether functional group can form a film at a high cross-linking concentration. Thus, a resolution increases and polymer swelling by an ink or a solvent can be prevented. An amount of the polyfunctional epoxy precursor polymer may be about 0.5 to about 20% by weight based on the total weight of the cross-linkable polymer resist composition. For example, the amount of the polyfunctional epoxy precursor polymer may be about 1 to about 5% by weight based on the total weight of the cross-linkable polymer resist composition.

Examples of the polyfunctional epoxy precursor polymer include, but are not limited to, EPON DPS-164 and EPON SU-8 (available from Shell Chemical), EPON DEN-431 and DEN-439 (available from Dow Chemical), and EHPE-3150 (available from Daicel Chemical).

Examples of a skeleton monomer for the phenol novolak precursor polymer may include, for example, phenol. The obtained glycidyl ether functional group novolak precursor polymer can be represented by Formula 1, below, in which n is an integer from 1 to 20, such as 1 to 10:

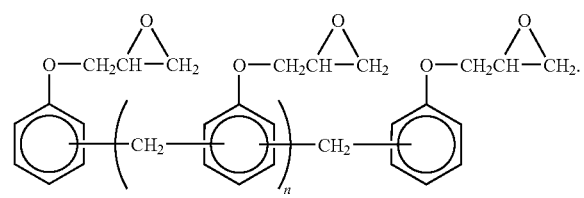

(Formula 1)

Also, examples of the skeleton monomer for the phenol novolak precursor polymer may include o-cresol and p-cresol having a branched structure of phenol. The obtained glycidyl ether functional group novolak precursor polymer can be represented by Formula 2 or Formula 3, below, in which n is an integer from 1 to 20, such as 1 to 10:

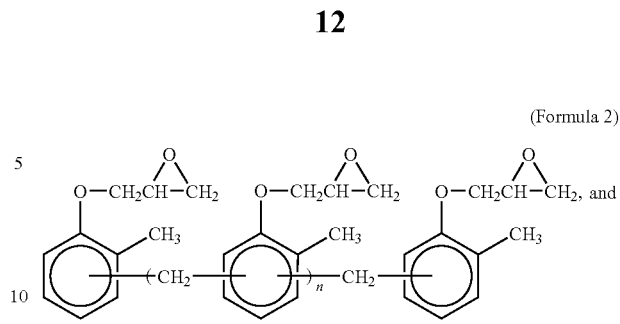

(Formula 2)

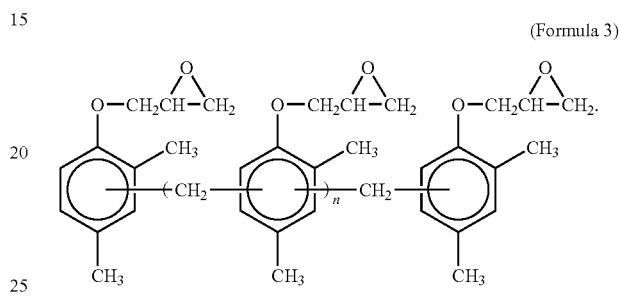

(Formula 3)

Also, examples of the skeleton monomer for the phenol novolak precursor polymer may include bisphenol A. The obtained glycidyl ether functional group novolak precursor polymer can be represented by Formula 5 or Formula 6, below, in which n is an integer from 1 to 20, such as 1 to 10:

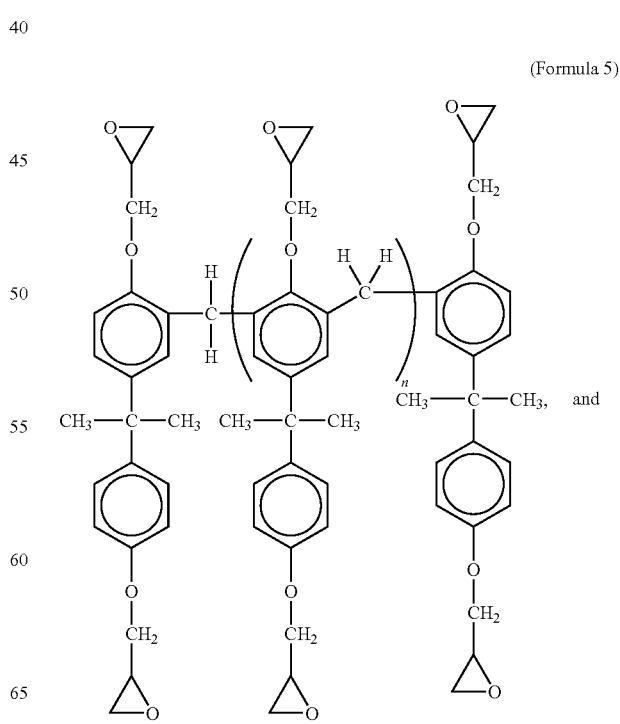

(Formula 5)

(Formula 6)

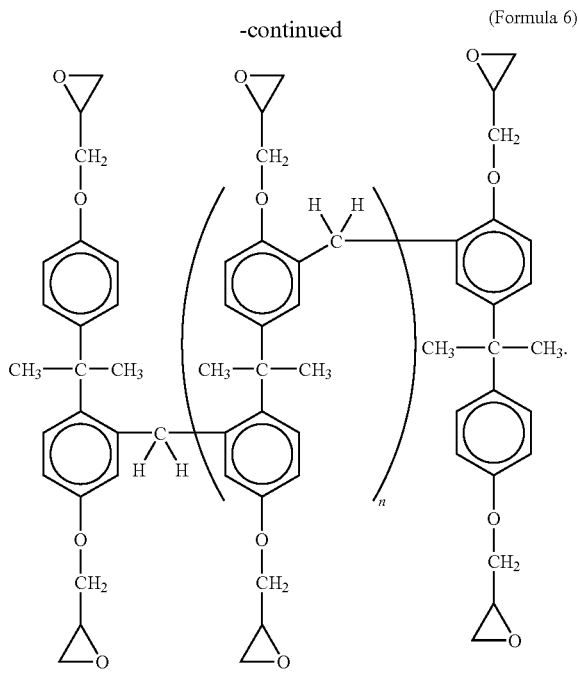

The glycidyl ether functional group alicyclic precursor polymer can be represented by Formula 7, below, in which n is an integer from 1 to 20, such as 1 to 10:

(Formula 7)

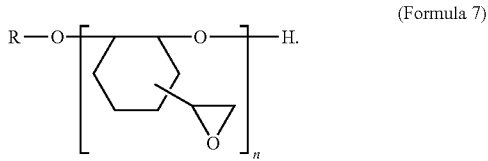

As discussed above, a repeating unit n of a monomer of each of the Formulae illustrated above may be an integer from 1 to 20, such as 1 to 10.

The cation photoinitiator generates ions or free radicals which initiate polymerization during light exposure. An amount of the cation photoinitiator may be about 4 to about 12% by weight based on the total weight of the cross-linkable polymer resist composition. For example, the amount of the cation photoinitiator may be about 6 to about 8% by weight based on the total weight of the cross-linkable polymer resist composition. If the amount of the cation photoinitiator is less than about 4% by weight, the meniscus of the ink is unstable. If the amount of the photoinitiator is greater than about 12% by weight, the meniscus of the ink is also unstable.

Examples of the cation photoinitiator include, but are not limited to, an aromatic halonium salt and an onium salt of Group VA elements and Group VIA elements of the Periodic Table, such as UVI-6974 (available from Union Carbide) or SP-172 (available from Asahi denka).

Examples of an aromatic sulfonium salt include, but are not limited to, tetrafluoroborate triphenyl sulfonium, tetrafluoroborate methyl diphenyl sulfonium, hexafluoro phosphate dimethyl phenylsulfonium, hexafluoro phosphorous acid triphenyl sulfonium, hexafluoroantimonic acid triphenyl sulfonium (UVI-6974), and hexafluoroantimonic acid phenylmethyl benzyl sulfonium.

Examples of an aromatic iodinium salt include, but are not limited to tetrafluoroborate diphenyl iodinium, hexafluoroantimonic acid diphenyl iodinium, and hexafluoroantimonic acid butylphenyl iodonium (SP-172).

Examples of the solvent included in the cross-linkable polymer resist composition include, but are not limited to, y-butyrolactone, xylene, $C_{1-6}$ acetate, propylene glycol methyl ether acetate, tetrahydrofurane, methyl ethyl ketone, methyl butyl ketone, cyclopentanone, and mixtures thereof. An amount of the solvent may be about 20 to about 90% by weight based on the total weight of the cross-linkable polymer resist composition. For example, the amount of the solvent may be about 45 to about 75% by weight based on the total weight of the cross-linkable polymer resist composition.

Examples of other additives useable in the cross-linkable polymer resist composition include, but are not limited to, a photo-sensitizer, a silane coupling agent, a filler, a viscosity modifier, and the like.

The photo-sensitizer absorbs light energy and facilitates energy transfer to other compounds, and thus a radical or ion initiator can be formed therefrom. The photo-sensitizer often extends a range of a wavelength of the light energy that is used to expose the cross-linkable polymer resist composition, and may be an aromatic light absorption chromophore. The photo-sensitizer may also induce a formation of a radical or ion photoinitiator.

If a sensitizer is present, an amount of the sensitizer may be about 0.1 to about 20% by weight based on the total weight of the cross-linkable polymer resist composition.

A method of manufacturing an inkjet printhead according to the present embodiment includes: (a) forming a heater to heat ink and an electrode to apply a current to the heater on a substrate; (b) patterning a first cross-linkable polymer resist composition on the substrate where the heater and the electrode are formed to form a flow path forming layer; (c) performing patterning by photolithography twice or more on the substrate where the flow path forming layer is formed to form a sacrificial layer having a top surface that is flat in a space surrounded by the flow path forming layer; (d) patterning a second cross-linkable polymer resist composition on the flow path forming layer and the sacrificial layer to form a nozzle layer, the second cross-linkable polymer resist composition including a precursor polymer, a cationic photoinitiator, and a solvent; (e) etching the substrate from a rear surface thereof to form an ink feed hole; and (f) removing the sacrificial layer. Furthermore, a concentration of the cationic photoinitiator in the cross-linkable polymer resist composition may be varied to control a tapered angle of a nozzle in the nozzle layer.

Figure 3A:
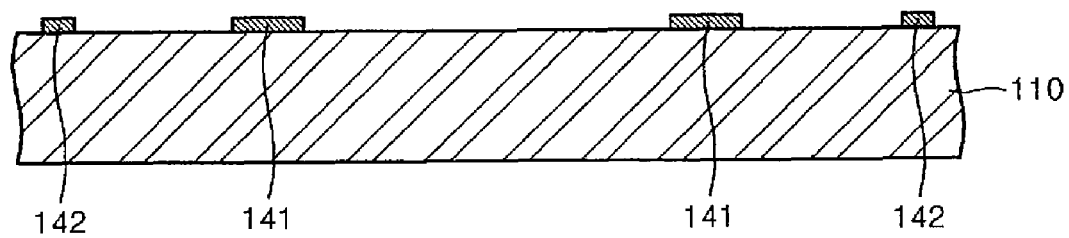
FIGS. 3A through 3R are cross-sectional views illustrating a method of manufacturing an inkjet printhead, according to another embodiment of the present general inventive concept.
Figure 3B:
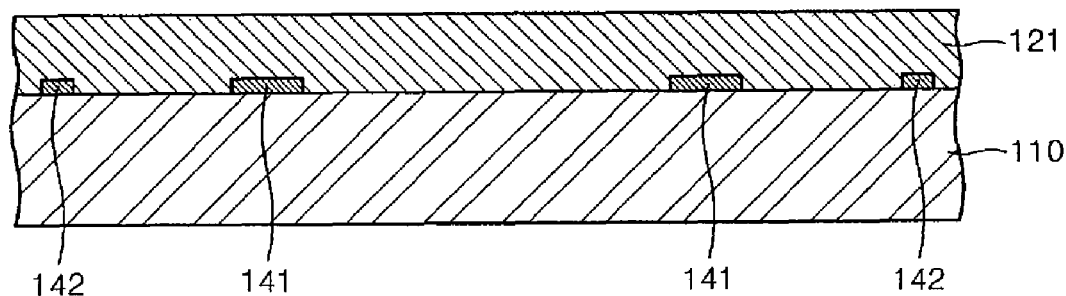
Figure 3C:
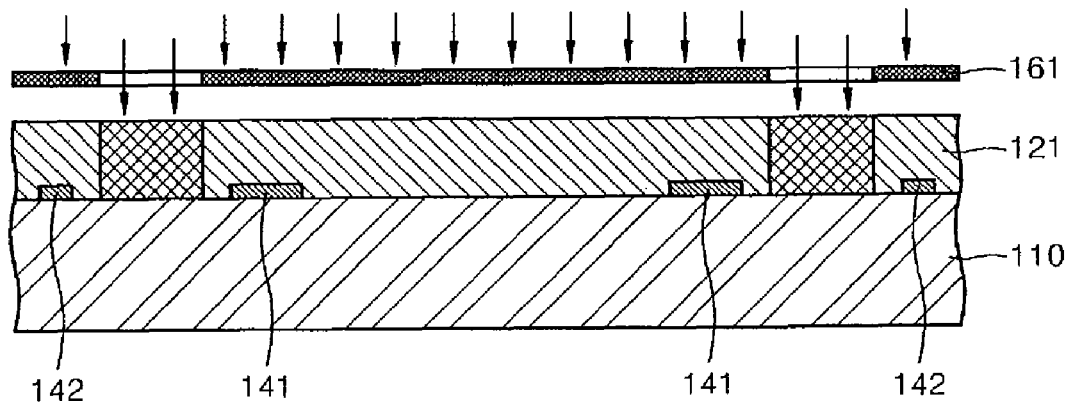
Figure 3D:
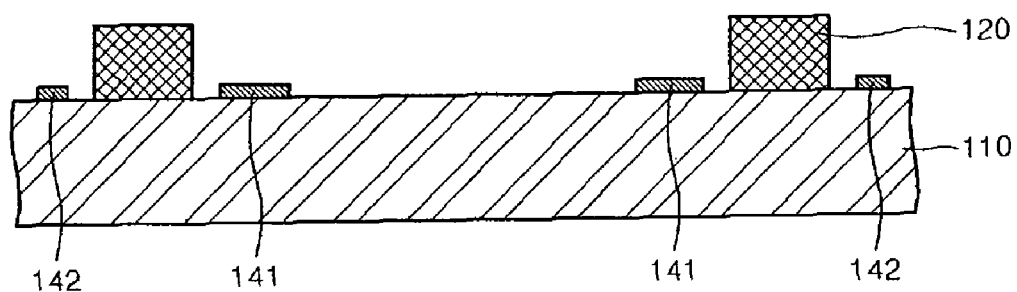
Figure 3E:
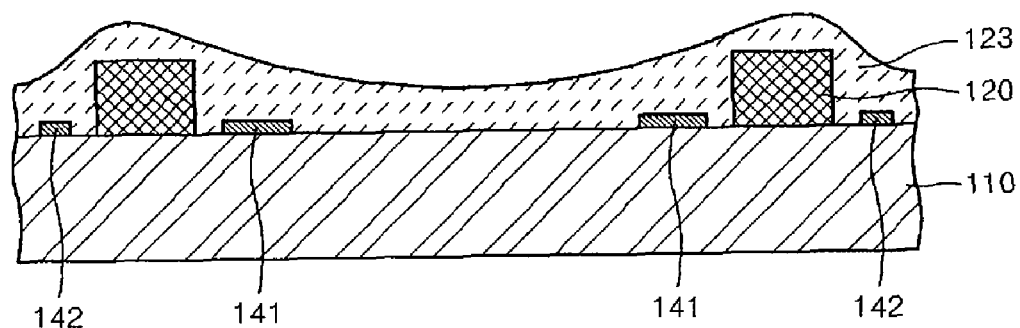
Figure 3F:
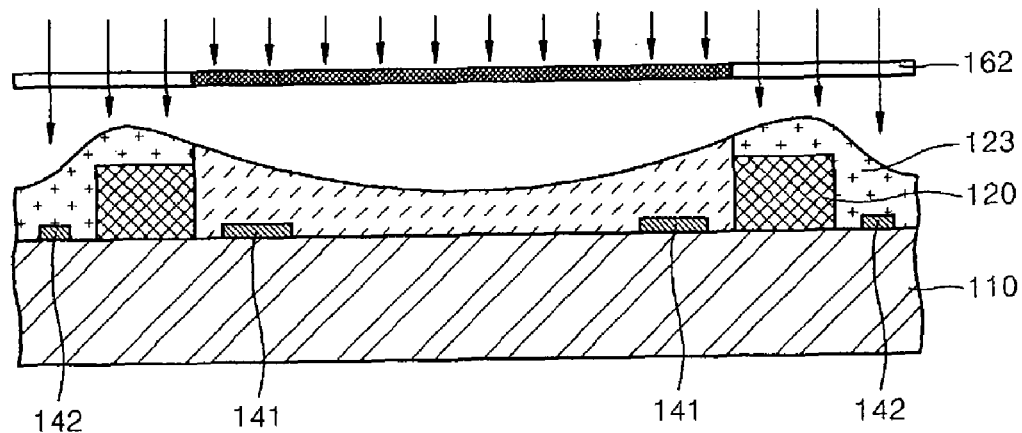
Figure 3G:
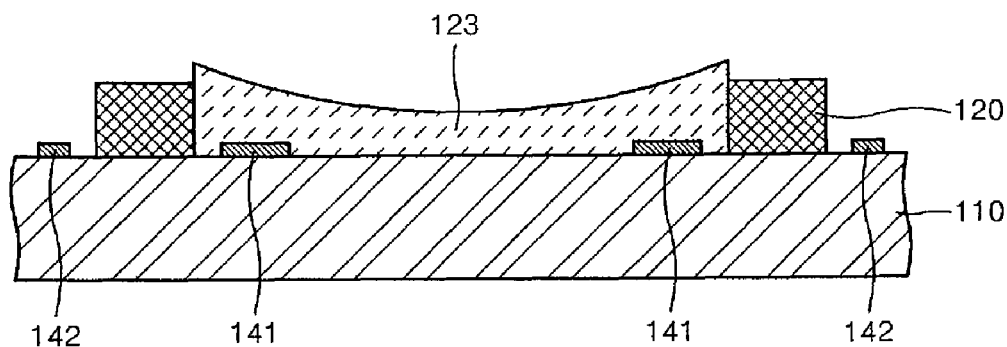
Figure 3H:
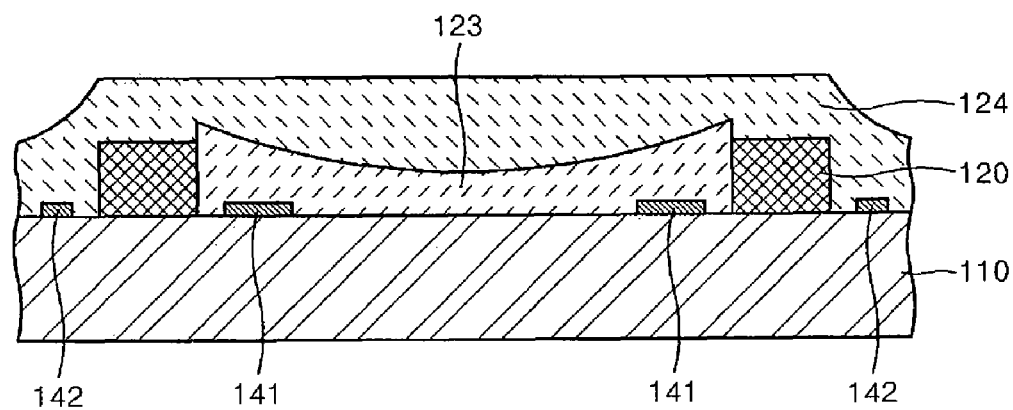
Figure 3I:
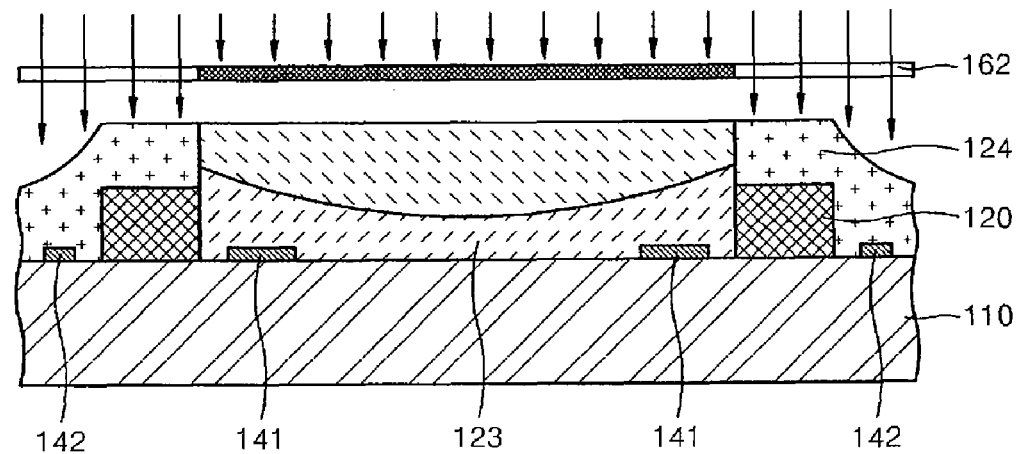
Figure 3J:
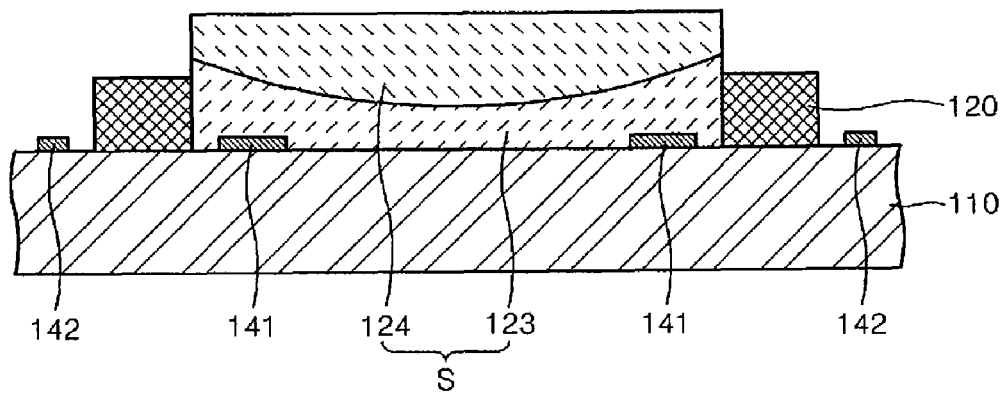
Figure 3K:
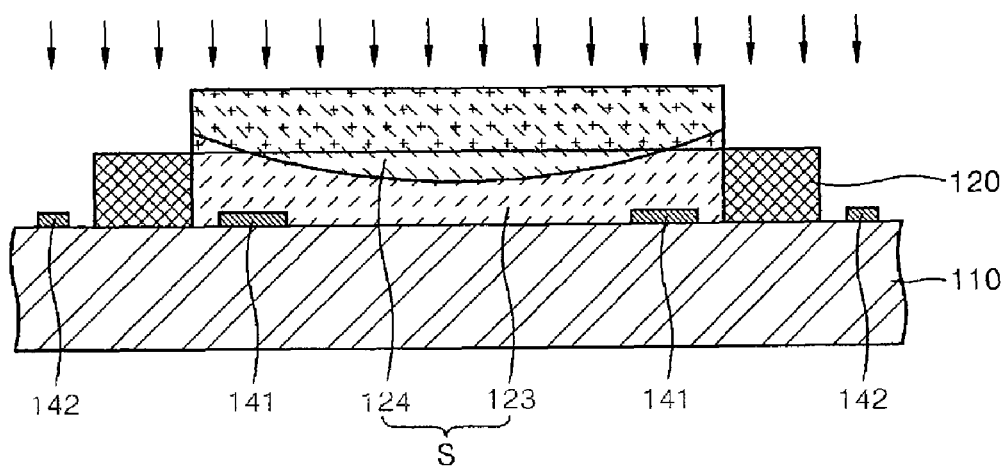
Figure 3L:
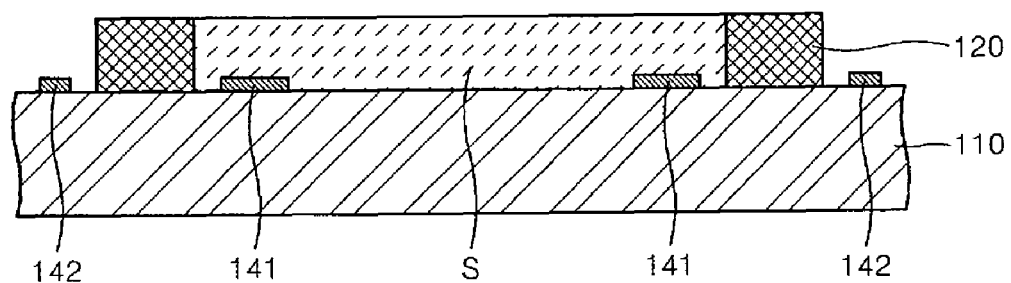
Figure 3M:
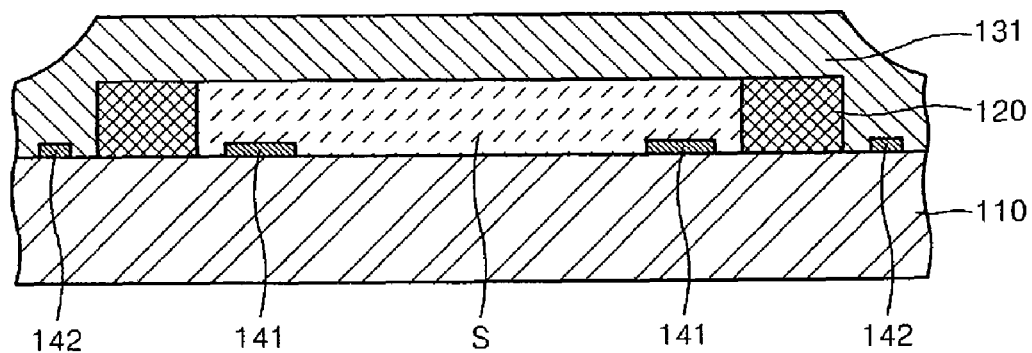
Figure 3N:
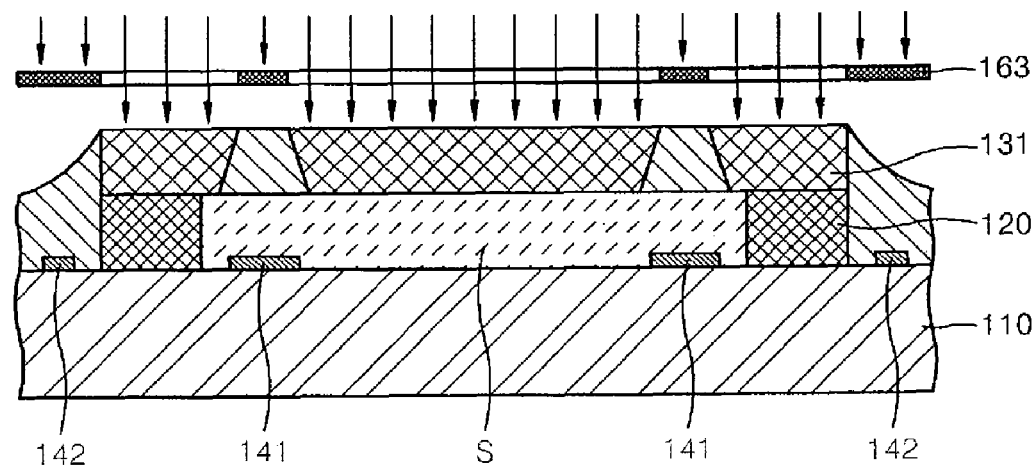
Figure 3O:
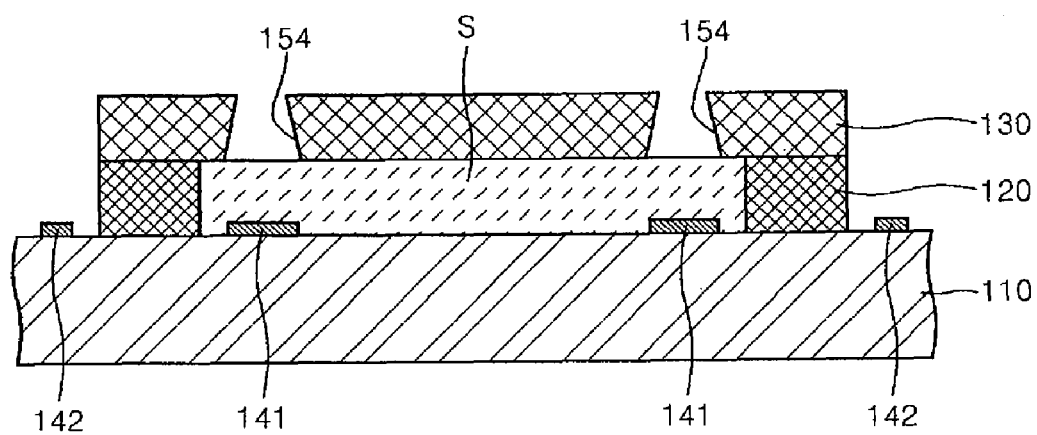
Figure 3P:
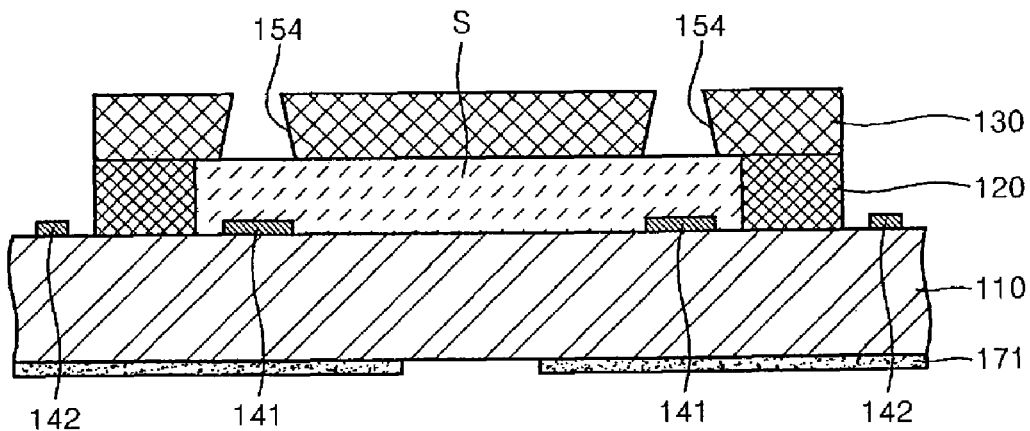
Figure 3Q:
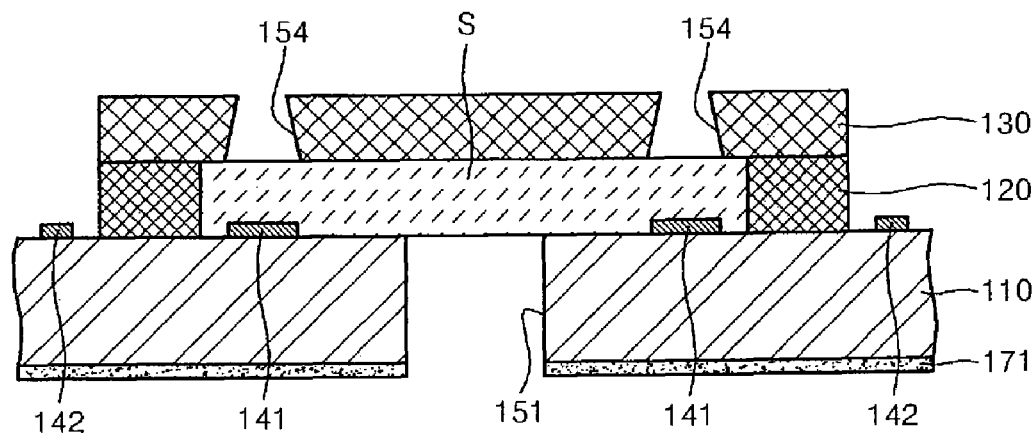
Figure 3R:
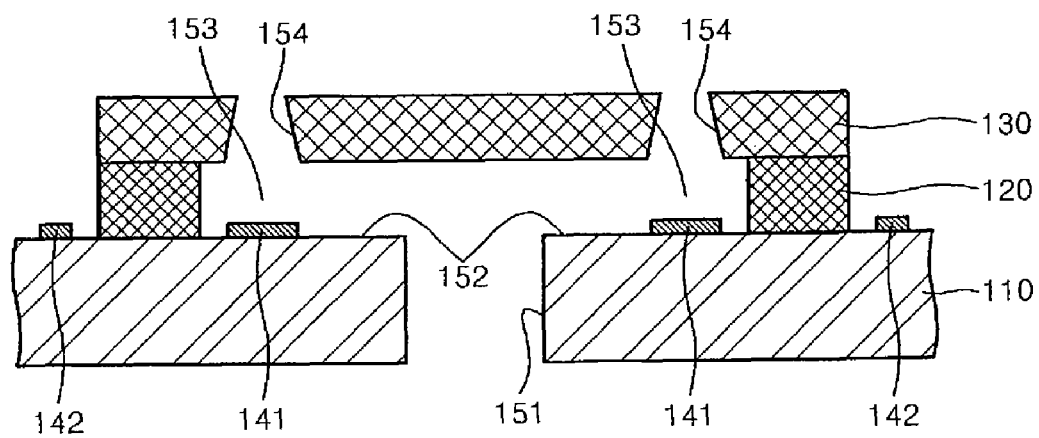

FIGS. 3A through 3R are cross-sectional views illustrating a method of manufacturing an inkjet printhead, according to an embodiment of the present general inventive concept;

First, as illustrated in FIG. 3A, a heater 141 to heat ink and an electrode 142 to apply a current to the heater 141 are formed on a substrate 110.

Here, the substrate 110 may be formed of silicon.

The heater 141 can be formed by depositing a resistance heating material, such as tantalum nitride or a tantalum aluminum alloy, using, for example, a sputtering or a chemical vapor deposition method, and then patterning the resistance heating material. The electrode 142 can be formed by depositing a metal having good electrical conductivity, such as aluminum or an aluminum alloy, using, for example, a sputtering method, and then patterning the material. Though not illustrated in FIG. 3A, a passivation layer formed of, for example, silicon oxide or silicon nitride, may be formed on the heater 141 and the electrode 142.

Next, as illustrated in FIG. 3B, a first cross-linked polymer resist layer 121 is formed on the substrate 110 where the heater 141 and the electrode 142 are formed. The first cross-linked polymer resist layer 121 forms a flow path forming layer 120 (see FIGS. 3D-3R) which surrounds an ink chamber 153 and a restrictor 152 (see FIG. 3R) in an operation that will be described later. The first cross-linked polymer layer 121 may be formed by coating a cross-linkable polymer resist composition, which is a negative photoresist, on an entire surface of the substrate 110 to a predetermined thickness. The cross-linkable polymer resist composition may include a precursor polymer, a cationic photoinitiator, and a solvent, as described above with reference to FIGS. 2A-2D. Here, the cross-linkable polymer resist composition is coated to an appropriate thickness corresponding to a height of the ink chamber 153 that can cover an amount of ejected ink droplets. The cross-linkable polymer resist composition can be coated on the substrate 110 using, for example, a spin coating method.

Next, as illustrated in FIG. 3C, the first cross-linked polymer resist layer 121, which is formed of the negative photoresist, is exposed to actinic radiation, such as UV radiation, using a first photomask 161 in which an ink chamber and a restrictor pattern are formed. During the exposure, a portion of the first cross-linked polymer resist layer 121 that is exposed to the UV radiation is hardened and thus resists chemical attack and has a high mechanical intensity. On the other hand, a portion of the first cross-linked polymer resist layer 121 that is not exposed to the UV radiation has properties that cause this portion to be dissolved by a developer.

Then the first cross-linked polymer resist layer 121 is developed, and as illustrated in FIG. 3D, the unexposed portions are removed to create a space, and the hardened portion remains to form the flow path forming layer 120.

FIGS. 3E through 3L illustrate operations in which a sacrificial layer S in a space surrounded by the flow path forming layer 120 is formed. According to the present embodiment, a top surface of the sacrificial layer S is made flat by coating and patterning a positive photoresist twice and planarizing the positive photoresist once.

In detail, as illustrated in FIG. 3E, the positive photoresist is coated to a predetermined thickness on the entire surface of the substrate 110 on which the flow path forming layer 120 is formed using, for example, a spin coating method to form a first sacrificial layer 123. The positive photoresist protrudes upward due to the protruding flow path forming layer 120, and thus a top surface of the first sacrificial layer 123 is not flat. As illustrated in FIG. 3F, the first sacrificial layer 123 is exposed to UV radiation using a second photomask 162 in which an ink chamber and a restrictor pattern are formed. During the exposure, a portion of the first sacrificial layer 123 that is exposed to UV radiation obtains properties that cause this portion to be easily dissolved by a developer. Accordingly, when the first sacrificial layer 123 is developed, as illustrated in FIG. 3G, only the unexposed portion of the first sacrificial layer 123 remains, and the exposed portion is removed.

Next, as illustrated in FIG. 3H, a positive photoresist is coated on the entire surface of the substrate 110 in which the flow path forming layer 120 and the first sacrificial layer 123 are formed using, for example, a spin coating method to form a second sacrificial layer 124. A top surface of the second sacrificial layer 124 can be made flat by the presence of the first sacrificial layer 123 that is filled in a space surrounded by the flow path forming layer 120.

Then, as illustrated in FIG. 3I, the second sacrificial layer 124 is exposed to UV radiation using the second photomask 162 that was used to expose the first sacrificial layer 123. Next, the second sacrificial layer 124 is developed to remove an unexposed portion of the second sacrificial layer 124. Then, as illustrated in FIG. 3J, the sacrificial layer S that is formed of the first and second sacrificial layers 123 and 124 and has a flat top surface is formed in the space surrounded by the flow path forming layer 120.

Next, as illustrated in FIG. 3K, the sacrificial layer S is exposed to UV radiation. The exposure may be a blank exposure which does not use a photomask. Exposure time and light intensity are controlled such that the sacrificial layer S is exposed to the same level as the top surface of the flow path forming layer 120. When the exposed portion of the sacrificial layer S is removed by developing, as illustrated in FIG. 3I, a height of the sacrificial layer S is lowered to be the same height as the flow path forming layer 120.

The sacrificial layer S has been described above as being formed by first coating, exposing, and developing the first sacrificial layer 123, then coating, exposing, and developing the second sacrificial layer 124, and then blank exposing the sacrificial layer S. However, the sacrificial layer S can be formed in a different sequence. For example, after coating, exposing, and developing the first developing layer 123, then the second sacrificial layer 124 can be coated and then blank exposure can be performed first (i.e., without exposing and developing the second sacrificial later 124 using the second photomask 162 before blank exposing the sacrificial layer S). In this way, the second sacrificial layer 124 and the first sacrificial layer 123 are formed to have the same height as the flow path forming layer 120 by a developing operation. Next, after exposure and developing are performed using the second photomask 162, the sacrificial layer S surrounded by the flow path forming layer 120 remains.

The sacrificial layer S can also be formed in the following manner. After coating, exposing, and developing the first sacrificial layer 123, the second sacrificial layer 124 is coated and exposed using the second photomask 162 and then blank exposure before the development operation. Alternatively, the two exposure operations can be performed in a reverse order before the development operation. Then when the exposed portion is developed and removed, the sacrificial layer S surrounded by the flow path forming layer 120 remains.

It has been described that a positive photoresist is coated twice to form a sacrificial layer S having a flat top surface; however, a positive photoresist can be coated three times or more according to a desired thickness of the sacrificial layer S. In this case, the more often a positive photoresist is coated, the more often the positive photoresist is exposed and developed.

Next, as illustrated in FIG. 3M, a second cross-linked polymer resist layer 131 is formed on the substrate 110 where the flow path forming layer 120 and the sacrificial layer S are formed.

Since the second cross-linked polymer resist layer 131 forms a nozzle layer 130 (see FIG. 3O) in the following operation, the second cross-linked polymer resist layer 131 is formed of a cross-linkable polymer resist composition, which is a negative photoresist and has a chemically stable property to ink like the flow path forming layer 120. The cross-linkable polymer resist composition may include a precursor polymer, a cationic photoinitiator, and a solvent, as described above with reference to FIGS. 2A-2D. The second cross-linked polymer resist layer 131 is formed by coating the cross-linkable polymer resist composition on the entire surface of the substrate 110 using, for example, a spin coating method. The cross-linkable polymer resist composition is coated to a thickness with which a desired length of a nozzle 154 can be secured and a sufficient intensity to endure pressure changes in the ink chamber.

In addition, as the top surface of the sacrificial layer S is made flat to have the same height as the top surface of the flow path forming layer 120, edges of the sacrificial layer S are not deformed or melted down by a reaction of the negative photoresist which forms the second photoresist layer 131 and the positive photoresist which forms the sacrificial layer S, unlike in the conventional manufacture of an inkjet printhead. Accordingly, the second cross-linked polymer resist layer 131 can be formed to be completely attached to the top surface of the flow path forming layer 120.

Next, as illustrated in FIG. 3N, the second cross-linked polymer resist layer 131 formed of the negative photoresist is exposed using a third photomask 163 in which a nozzle pattern is formed. Then when the second cross-linked polymer resist layer 131 is developed, as illustrated in FIG. 3O, an unexposed portion is removed and the nozzle 154 is formed, and an exposed portion thereof hardened by the exposure remains to form the nozzle layer 130. In this case, a predetermined taper angle of the nozzle 154 is formed according to a concentration of the cationic photoinitiator in the cross-linkable polymer resist composition of the second cross-linked polymer resist layer 131. The exposure may be performed by actinic radiation. For example, UV radiation having a shorter wavelength than I-line (353 nm) or an e-beam or X rays having a shorter wavelength than I-line (353 nm) may be used. Thus when exposure is performed using light with a relatively short wavelength, a light penetration depth is shortened, and thus the sacrificial layer S under the second cross-linked polymer resist layer 131 is not affected by exposure thereto. Accordingly, nitride gas is not generated in the sacrificial layer S formed of the positive photoresist, and thus the nozzle layer 130 is not deformed by the nitride gas, unlike in the conventional manufacture of an inkjet printhead.

Figure 5A:
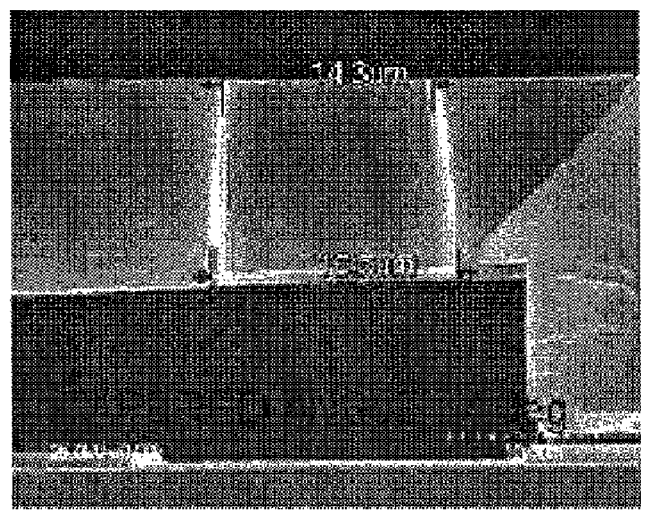
FIGS. 5A through 5C are vertical cross-sectional photographs of an inkjet printhead manufactured according to an embodiment of the present general inventive concept.
Figure 5B:
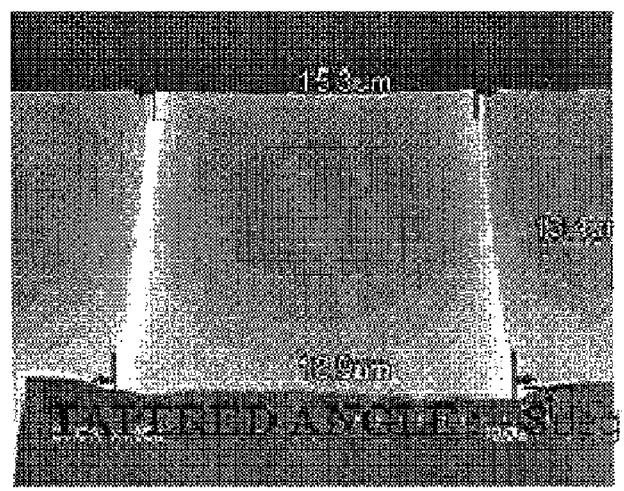
Figure 5C:
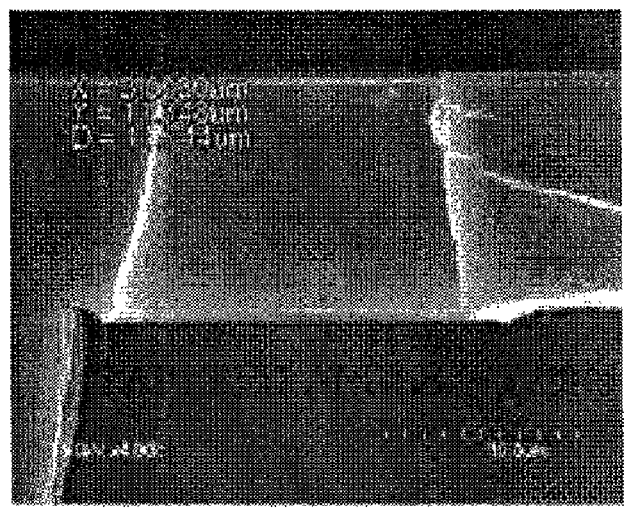
Figure 6:
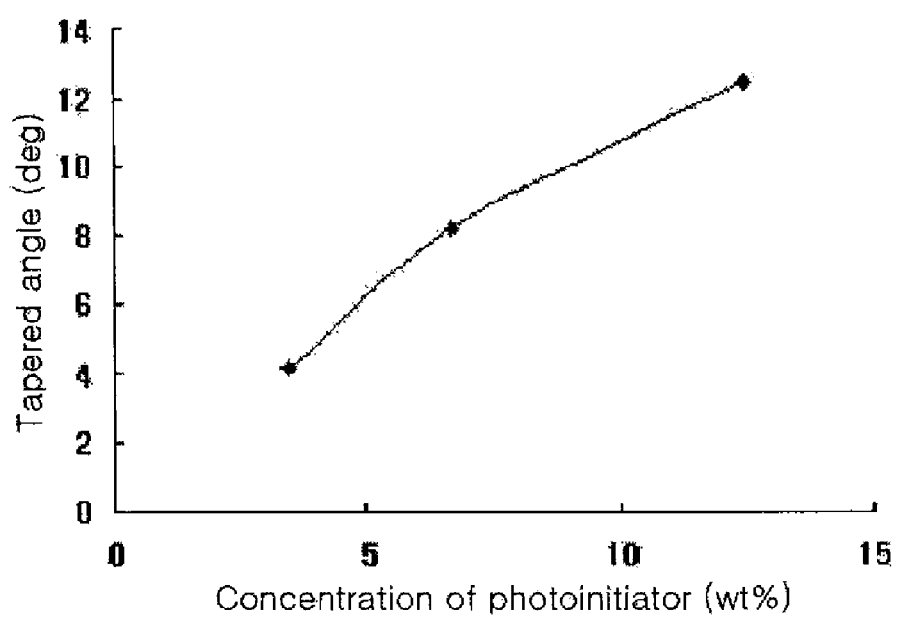
FIG. 6 is a graph illustrating tapered angle variation according to a concentration of a cationic photoinitiator of an inkjet printhead manufactured according to an embodiment of the present general inventive concept.

As illustrated in FIGS. 5A through 5C, as the concentration of the cationic photoinitiator included in the second cross-linked polymer resist layer 131 increases, the tapered angle of the nozzle 154 increases. These results are illustrated in FIG. 6.

Next, as illustrated in FIG. 3P, an etching mask 171 is used to form an ink feed hole 151 (see FIG. 3Q) on a rear surface of the substrate 110. The etching mask 171 can be formed by coating a positive or negative photoresist on a rear surface of the substrate 110 and then patterning the positive or negative photoresist.

Next, as illustrated in FIG. 3Q, the substrate 110 is etched to have a hole from the rear surface of the substrate 110 that is exposed using the etching mask 171 to form the ink feed hole 151, and then the etching mask 171 is removed. In detail, the rear surface of the substrate 110 can be etched using a dry etching method, for example, using plasma, or using a wet etching method, for example, using tetramethyl ammonium hydroxide (TMAH) or KOH as an etchant.

Then, when the sacrificial layer S is removed using a solvent, as illustrated in FIG. 3R, the ink chamber 153 and the restrictor 152 surrounded by the flow path forming layer 120 are formed in the space formerly occupied by the sacrificial layer S.

Thus, an inkjet printhead having the structure as illustrated in FIG. 3R is produced. Also, according to the method of the present embodiment, a step between the chamber layer and the sacrificial layer S of the inkjet printhead may be less than 3 µm.

Hereinafter, a method of manufacturing an inkjet printhead, according to another embodiment of the present general inventive concept, will be described with reference to FIGS. 4A through 4F. Descriptions in this embodiment common to the previous embodiments will not be repeated.

Figure 4A:
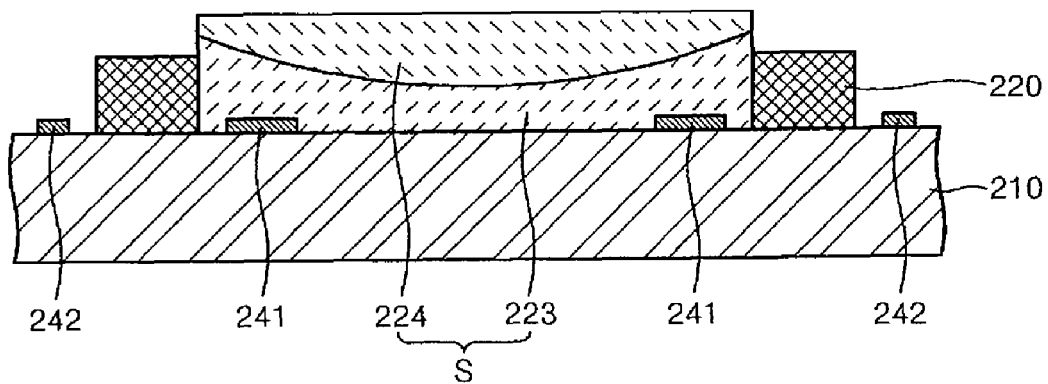
FIGS. 4A through 4F are cross-sectional views illustrating a method of manufacturing an inkjet printhead, according to another embodiment of the present general inventive concept.

Operations up to forming a sacrificial layer S on a substrate 210 are the same as operations of the method of the previous embodiment illustrated in FIGS. 3A through 3I. As illustrated in FIG. 4A, a heater 241 to heat ink and an electrode 242 to apply a current to the heater 241 are formed on the substrate 210. Then, a cross-linkable polymer resist composition is coated to a predetermined thickness on the substrate 210 where the heater 241 and the electrode 242 are formed, and then exposed and developed to form a first cross-linked polymer layer, that is, a flow path forming layer 220. The flow path forming layer 220 can be formed to be lower than a desired height of an ink chamber 253 (see FIG. 4F).

A positive photoresist is coated on an entire surface of the substrate 210 where the flow path forming layer 220 is formed to a predetermined thickness using, for example, a spin coating method to form a first sacrificial layer 223, and is patterned by exposing and developing operations. Next, a positive photoresist is coated on the entire surface of the substrate 210 to a predetermined thickness using, for example, a spin coating method to form a second sacrificial layer 224, and is patterned by exposing and developing operations. Thus, as illustrated in FIG. 4A, the sacrificial layer S, which is formed of the first sacrificial layer 223 and the second sacrificial layer 224 and has a flat top surface, is formed in a space surrounded by the flow path forming layer 220.

In the present embodiment, an imide-based positive photoresist is used as the positive photoresist forming the sacrificial layer S, and a blank exposure to lower a height of the sacrificial layer S to a height of the flow path forming layer 220 and a development thereof are not performed. The imide-based positive photoresist, which is baked in a hard baking process at approximately 140° C. after development, is not affected by a solvent included in a negative photoresist and does not generate a nitride gas, even after exposure.

Figure 4B:
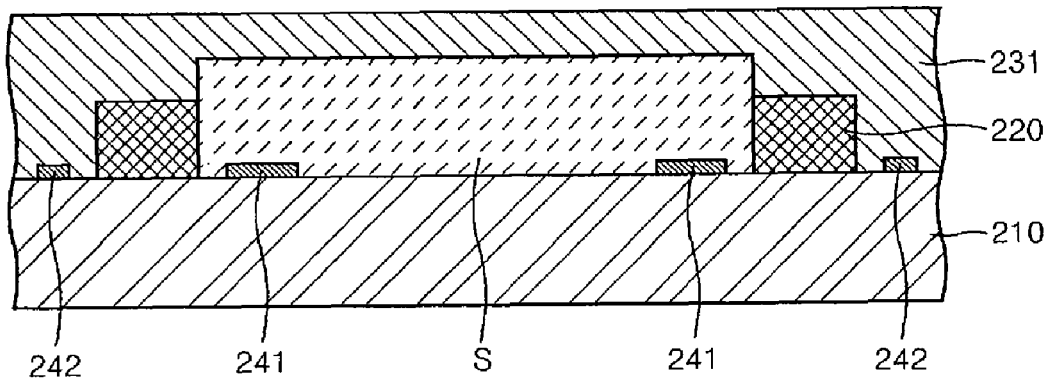

Next, as illustrated in FIG. 4B, a second cross-linked polymer layer 231 is formed on the substrate 210 where the flow path forming layer 220 and the sacrificial layer S are formed. As the second cross-linked polymer layer 231 forms a nozzle layer 230 (see FIGS. 4D-4F) in an operation to be described later, the second cross-linked polymer layer 231 is formed of a cross-linkable polymer resist composition, which is a negative photoresist, that is chemically stable with respect to ink. The cross-linkable polymer resist composition may include a precursor polymer, a cationic photoinitiator, and a solvent, as described above with reference to FIGS. 2A-2D. The second cross-linked polymer layer 231 is formed in the same manner as the second cross-linked polymer layer 131 of the previous embodiment as illustrated in FIGS. 3M through 3O.

In addition, even when the sacrificial layer S in the present embodiment is formed to protrude to be higher than the flow path forming layer 220, as the sacrificial layer S is formed of the imide-based positive photoresist, the sacrificial layer S is not affected by the solvent included in the negative photoresist forming the second cross-linked polymer layer 231. Thus the edges of the sacrificial layer S are not deformed or melted down.

Figure 4C:
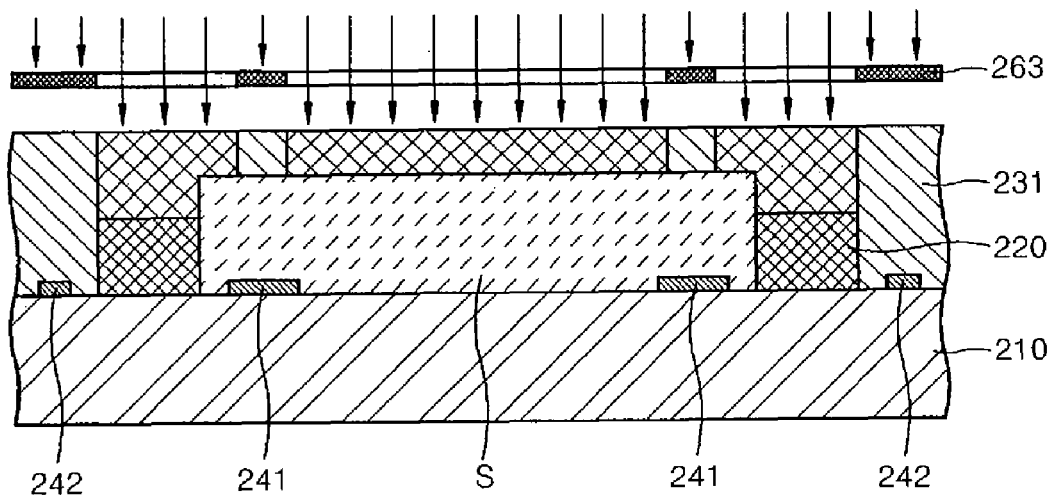
Figure 4D:
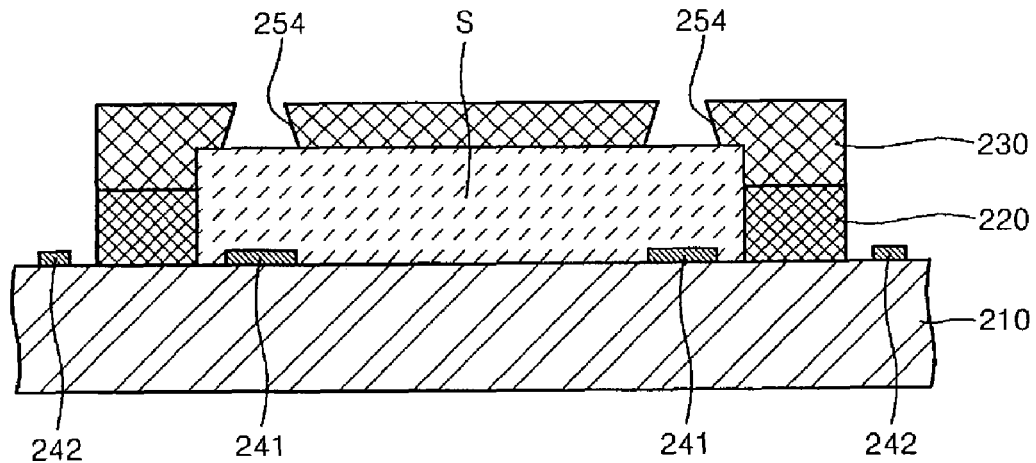

Next, as illustrated in FIG. 4C, the second cross-linked polymer layer 231 formed of the negative photoresist is exposed using a photomask 263 in which a nozzle pattern is formed. Then when the second cross-linked polymer layer 231 is developed, as illustrated in FIG. 4D, an unexposed portion thereof is removed and a nozzle 254 is formed, and a hardened portion thereof due to the exposure remains to form the nozzle layer 230. A tapered angle formed in the nozzle 254 varies depending on a concentration of the cationic photoinitiator included in the cross-linkable polymer resist composition of the second cross-linked polymer layer 231 in this case.

In the present embodiment, the imide-based positive photoresist forming the sacrificial layer S has a property of not generating a nitride gas even after being exposed, and thus the problem of the nozzle layer 230 being deformed by a nitride gas as in the conventional method does not occur. The exposure may be performed by actinic radiation. For example, the actinic radiation can include broadband UV radiation including not only I-line (353 nm) but H-line (405 nm) and G-line (436 nm), or an e-beam or X rays having a shorter wavelength than I-line (353 nm).

Figure 4E:
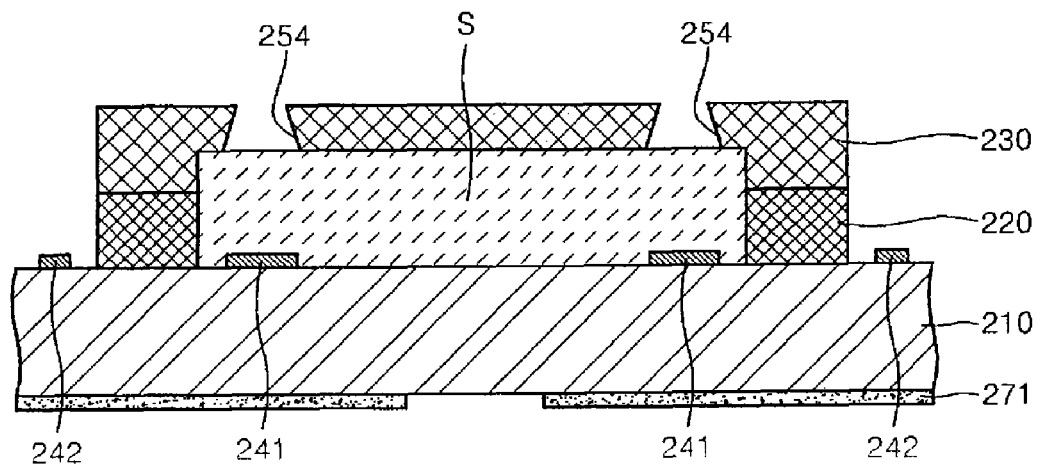

Next, as illustrated in FIG. 4E, an etching mask 271 is formed on a rear surface of the substrate 210 such that the substrate 210 has a hole from the rear surface thereof that is exposed using the etching mask 271 to form an ink feed hole 251 using, for example, a dry etching method or a wet etching method. The method of forming the etching mask 271 and the ink feed hole 251 is the same as the method of forming the etching mask 171 and the ink feed hole 151 of the previous embodiment as illustrated in FIGS. 3P through 3R.

Figure 4F:
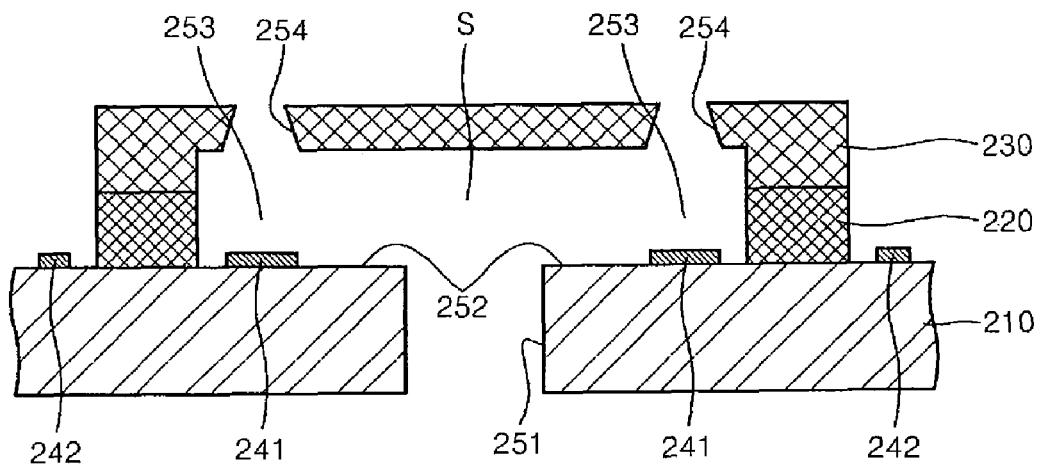

Finally, when the sacrificial layer S is removed using a solvent, as illustrated in FIG. 4F, the ink chamber 253 and a restrictor 252 surrounded by the flow path forming layer 220 are formed in the space formerly occupied by the sacrificial layer S.

Thus, an inkjet printhead having a structure as illustrated in FIG. 4F is produced.

The inkjet printhead according to embodiments of the present general inventive concept manufactured using any of the above described methods includes a nozzle layer in which a tapered ink ejection nozzle is formed. The nozzle layer is a hardening result of an epoxy resin composition formed by exposure to actinic radiation, and the tapered angle of the nozzle is at about 5° to about 12° with respect to a surface that is perpendicular to the nozzle layer, and a cross-section of the nozzle decreases in an ink ejecting direction.

Also, an inkjet printhead according to embodiments of the present general inventive concept manufactured using any of the above described methods includes a nozzle layer in which a tapered ink ejection nozzle is formed, in which the nozzle layer is a hardening result of a cross-linked polymer resist composition formed by exposure to actinic radiation. The cross-linked polymer resist composition includes:

(a) one or more epoxy precursor polymers selected from the group represented by Formulas 1 through 7:

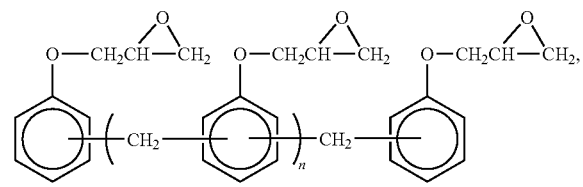

(Formula 1)

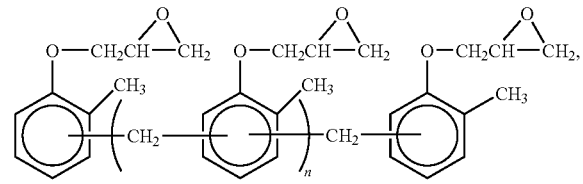

(Formula 2)

-continued

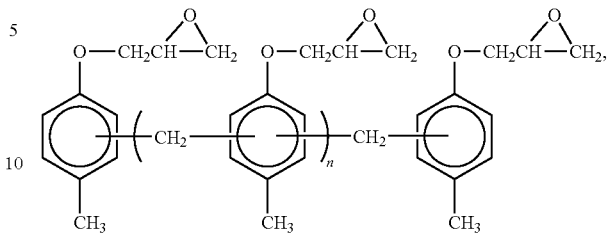

(Formula 3)

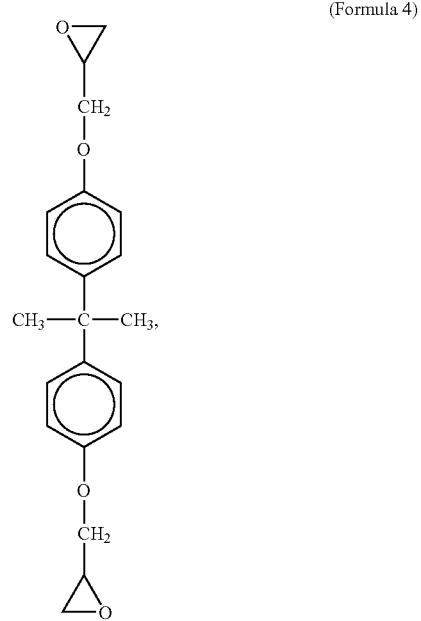

(Formula 4)

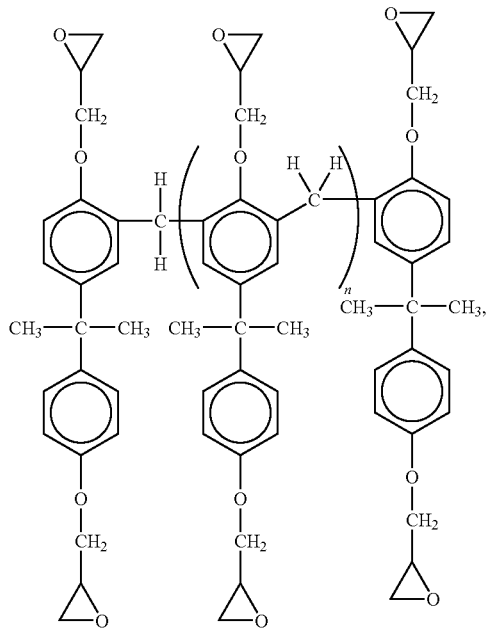

(Formula 5)

-continued

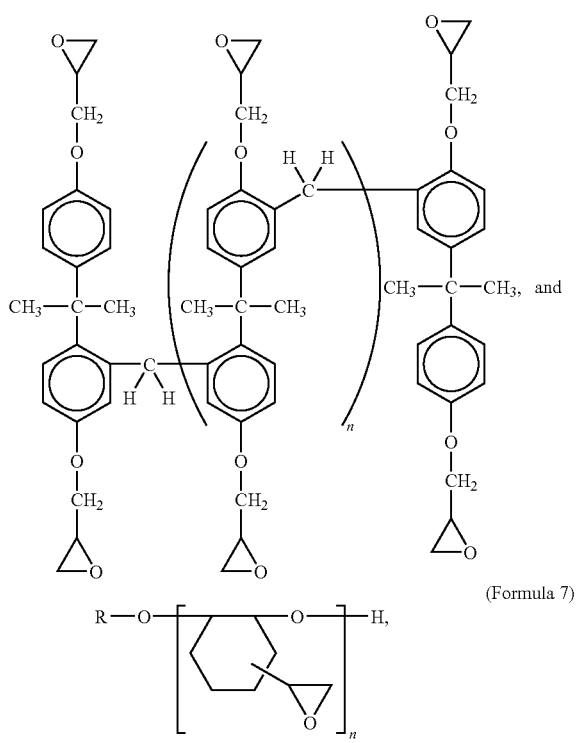

(Formula 6)

(Formula 7)

in which n is an integer from 1 to 20; (b) 4-12% by weight of a cationic photoinitiator based on the total weight of the cross-linked polymer resist composition; and (c) a solvent.

EXAMPLE

Fabrication of Resist Composition 1:

50 ml of Xylene (available from Samchun Chemical Co.) and 5 ml (3.45 wt %) of SP-172 (available from Asahi Eenka Korea Chemical Co.) were put in a container. Next, 90 g of EHPH-3150 epoxy resin (available from Daicel Chemical Co.) was added to the container. Then, the above solution was agitated for 24 hours.

Fabrication of Resist Composition 2:

Resist Composition 2 was manufactured in the same manner as Resist Composition 1, except that 10 ml (6.67 wt %) of SP-172 (available from Asashi Eenka Korea Chemical Co.) was used (as opposed to 5 ml).

Fabrication of Resist Composition 3:

Resist Composition 3 was manufactured in the same manner as Resist Composition 1, except that 20 ml (12.5 wt %) of SP-172 (available from Asashi Eenka Korea Chemical Co.) was used (as opposed to 5 ml).

FIGS. 5A through 5C are electronic microscopic photographs of a nozzle of an inkjet printhead obtained using the Resist Compositions 1-3, and FIG. 6 is a graph illustrating a relationship between a tapered angle of a nozzle and a concentration of a cationic photoinitiator in a cross-linked polymer resist composition. As illustrated in FIGS. 5A through 5C and 6, as the concentration of the cationic photoinitiator increases, the tapered angle of the nozzle increases.

Using methods of manufacturing an inkjet printhead according to embodiments of the present general inventive concept, a tapered angle of a nozzle can be controlled without additional processes, and thus an optimum behavior of an ink meniscus can be obtained. As a result, the inkjet printhead manufactured using methods according to embodiments of the present general inventive concept has improved ink ejecting characteristics, such as ink ejection speed, frequency, and ejection shape.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of manufacturing an inkjet printhead, the method comprising:
   forming a nozzle layer by radiating actinic radiation to a cross-linkable polymer resist composition comprising an epoxy precursor polymer, a cationic photoinitiator, and a solvent,
   wherein a tapered angle of a nozzle included in the nozzle layer is controlled by varying a concentration of the cationic photoinitiator in the cross-linkable polymer resist composition.

2. The method of claim 1, wherein, as the concentration of the cationic photoinitiator increases, the tapered angle of the nozzle increases.

3. The method of claim 1, wherein an amount of the cationic photoinitiator is about 4 to about 12% by weight based on a total weight of the cross-linked polymer resist composition.

4. The method of claim 1, wherein the tapered angle of the nozzle is about 5° to about 12°.

5. The method of claim 1, wherein an exposure energy level of the actinic radiation radiated to the cross-linked polymer resist composition is about 50 to about 500 mJ/cm$^2$.

6. The method of claim 1, wherein the epoxy precursor polymer is formed of a skeleton monomer comprising at least one member selected from the group consisting of phenol, o-cresol, p-cresol, bisphenol-A, cycloaliphatic, and mixtures thereof.

7. The method of claim 1, wherein the epoxy precursor polymer comprises at least one member selected from the group consisting of

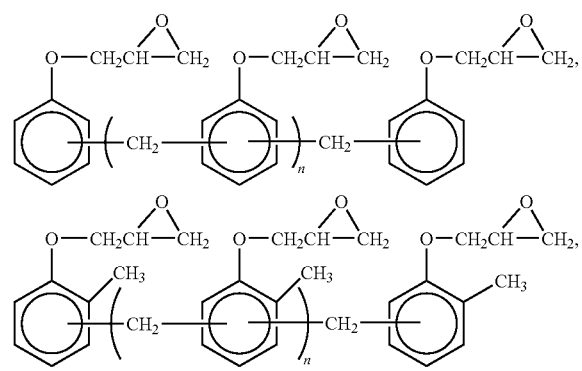

-continued

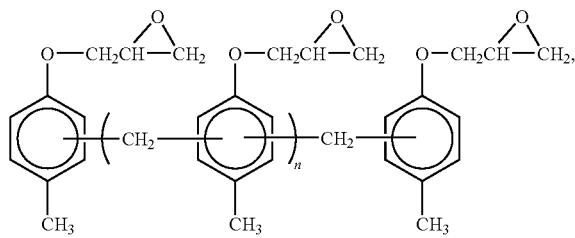

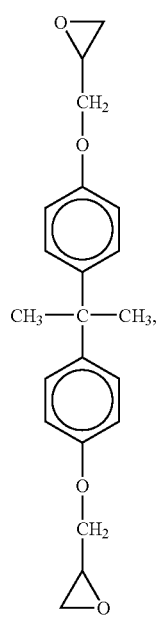

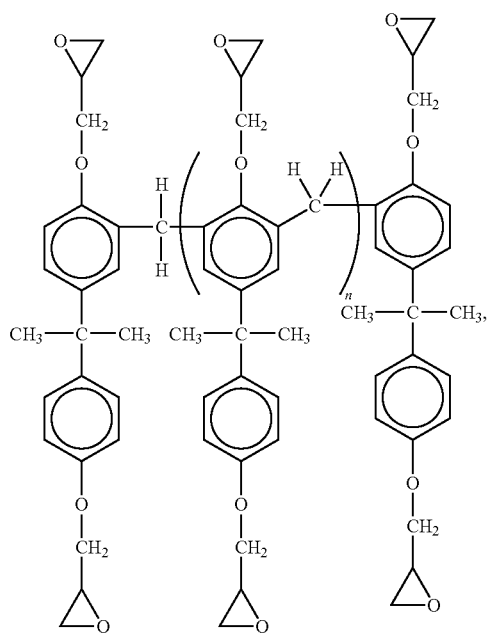

-continued

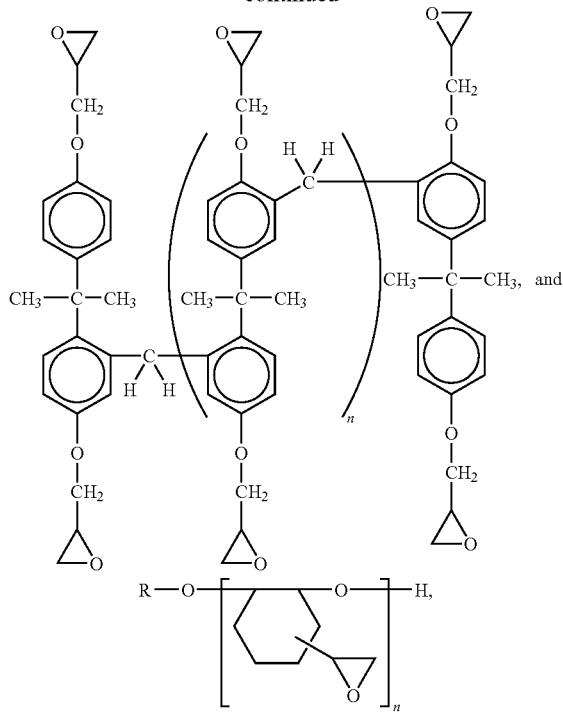

wherein n is an integer from 1 to 20.

8. The method of claim 1, wherein the cationic photoinitiator comprises sulfonium salt or iodinium salt.

9. The method of claim 1, wherein an amount of the solvent is about 20 to about 90% by weight based on a total weight of the cross-linked polymer resist composition.

10. The method of claim 1, wherein the solvent comprises at least one member selected from the group consisting of a-butyrolactone, propylene glycol methyl ethyl acetate, tetrahydrofurane, methyl ethyl ketone, methyl isobutyl ketone, cyclopentanone, and mixtures thereof.

11. A method of manufacturing a printhead, comprising:
forming a flow path forming layer by coating a first cross-linkable polymer resist composition on a surface of a substrate and hardening portions of the first composition by exposing the first composition to actinic radiation using a photomask;
coating a second cross-linkable polymer resist composition on a surface of the flow path forming layer, the second cross-linkable polymer resist composition comprising an epoxy precursor polymer, a cationic photoinitiator, and a solvent;
cross-linking exposed portions of the second cross-linkable polymer resist composition exposed through a mask having a nozzle layer pattern;
removing unexposed portions of the second cross-linkable polymer resist composition unexposed through the mask to form a nozzle layer having a tapered nozzle; and
controlling a degree of tapering of the tapered angle by controlling a concentration of the cationic photoinitiator in the cross-linkable polymer resist composition.

12. A method of manufacturing a printhead, comprising:
forming a flow path forming layer by coating a first cross-linkable polymer resist composition on a surface of a substrate and hardening portions of the first composition by exposing the first composition to actinic radiation using a photomask;

coating a second cross-linkable polymer resist composition on a surface of the flow path forming layer, the second cross-linkable polymer resist composition comprising an epoxy precursor polymer, a cationic photoinitiator, and a solvent;

cross-linking exposed portions of the second cross-linkable polymer resist composition exposed through a mask having a nozzle layer pattern; and removing unexposed portions of the second cross-linkable polymer resist composition unexposed through the mask to form a nozzle layer having a tapered nozzle, wherein:

the surface of the substrate comprises the flow path forming layer to form an ink chamber, a heater to heat ink in the ink chamber, a sacrificial layer covering the heater, and an electrode to apply a current to the heater; and the coating of the second cross-linkable polymer resist composition comprises coating the second cross-linkable polymer resist composition on the surface of the substrate, the flow path forming layer, the sacrificial layer, and the electrode.

13. The method of claim 12, further comprising:

coating a first positive photoresist on the surface of the substrate having the flow path forming layer, the heater, and the electrode to cover the surface of the substrate, the flow path forming layer, the heater, and the electrode;

exposing portions of the first positive photoresist to actinic radiation through a photomask and removing the exposed portions of the first positive photoresist;

coating a second positive photoresist on the surface of the substrate having the flow path forming layer, the heater covered by the first positive photoresist, and the electrode to cover the surface of the substrate, the flow path forming layer, the first positive photoresist, and the electrode; and exposing portions of the second positive photoresist to actinic radiation through the photomask and removing the exposed portions of the second positive photoresist, wherein the sacrificial layer comprises unexposed portions of the first and second positive photoresists unexposed through the photomask.

14. The method of claim 13, further comprising:

blank exposing the sacrificial layer to actinic radiation to lower a height of the sacrificial layer to correspond to a height of the flow path forming layer before coating the second cross-linkable polymer resist composition on the surface of the substrate, the flow path forming layer, the sacrificial layer having the height that equal to the height of the flow path forming layer, and the electrode.

15. The method of claim 13, wherein the first and second positive photoresists are imide-based positive photoresists, a height of the sacrificial layer, is higher than a height of the flow path forming layer, and the coating of the second cross-linkable polymer resist composition comprises coating the second cross-linkable polymer resist composition on the surface of the substrate, the flow path forming layer, the sacrificial layer having the height that is higher than the height of the flow path forming layer, and the electrode.

16. A method of manufacturing a printhead, comprising:

forming a heater to heat ink and an electrode to apply a current to the heater on a substrate;

patterning a first cross-linkable polymer resist composition on the substrate where the heater and the electrode are formed to form a flow path forming layer;

performing patterning by photolithography twice or more on the substrate where the flow path forming layer is formed to form a sacrificial layer having a top surface that is flat in a space surrounded by the flow path forming layer;

patterning a second cross-linkable polymer resist composition on the flow path forming layer and the sacrificial layer to form a nozzle layer, the second cross-linkable polymer resist composition comprising a precursor polymer, a cationic photoinitiator, and a solvent;

etching the substrate from a rear surface thereof to form an ink feed hole; and removing the sacrificial layer.

17. A cross-linkable polymer negative resist composition, comprising:

an epoxy precursor polymer;
a cationic photoinitiator;
a solvent; and
a quantity of generated hydrogen ions that decreases along an inclination towards a bottom of the cross-linkable polymer negative resist composition from a top of the cross-linkable polymer negative resist composition.

18. The composition of claim 17, wherein the cationic photoinhibitor is selected from the group consisting of an aromatic halonium salt of a Group VA element and an onium salt of a Group VIA elements of the Periodic Table.

* * * * *